US011924605B2

(12) United States Patent
MacLean et al.

(10) Patent No.: US 11,924,605 B2
(45) Date of Patent: Mar. 5, 2024

(54) ACOUSTIC WAVEGUIDES FOR MULTI-CHANNEL PLAYBACK DEVICES

(71) Applicant: Sonos, Inc., Santa Barbara, CA (US)

(72) Inventors: Paul MacLean, Quincy, MA (US); Tristan Taylor, Boston, MA (US); Wulin Xia, Seattle, WA (US); Daniel Brim, Boston, MA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

(21) Appl. No.: 18/056,221

(22) Filed: Nov. 16, 2022

(65) Prior Publication Data

US 2023/0076601 A1 Mar. 9, 2023

Related U.S. Application Data

(62) Division of application No. 17/249,029, filed on Feb. 17, 2021, now Pat. No. 11,528,555.

(Continued)

(51) Int. Cl.

*H04R 1/34* (2006.01)
*H04R 1/02* (2006.01)

(Continued)

(52) U.S. Cl.

CPC ............ *H04R 1/345* (2013.01); *H04R 1/025* (2013.01); *H04R 1/26* (2013.01); *H04R 3/12* (2013.01); *H04R 7/12* (2013.01); *H04R 7/16* (2013.01)

(58) Field of Classification Search

CPC .......... H04R 1/345; H04R 1/025; H04R 1/26; H04R 3/12; H04R 7/12; H04R 7/16

See application file for complete search history.

(56) References Cited

U.S. PATENT DOCUMENTS

| | | | |
|---|---|---|---|
| 5,440,644 | A | 8/1995 | Farinelli et al. |
| 5,761,320 | A | 6/1998 | Farinelli et al. |

(Continued)

FOREIGN PATENT DOCUMENTS

| | | | |
|---|---|---|---|
| EP | 1389853 A1 | 2/2004 | |
| WO | 200153994 | 7/2001 | |
| WO | 2003093950 A2 | 11/2003 | |

OTHER PUBLICATIONS

AudioTron Quick Start Guide, Version 1.0, Mar. 2001, 24 pages.

(Continued)

*Primary Examiner* — Andrew L Sniezek

(74) *Attorney, Agent, or Firm* — Fortem IP LLP; Matt Lincicum

(57) ABSTRACT

Acoustic waveguides can be used to improve audio performance of playback devices, such as a soundbar. Such a playback device can include an elongated body defining an outer perimeter with a forward surface, an upper surface, and a rounded edge between the forward surface and the upper surface. An up-firing transducer is configured to direct sound along an axis that has a vertical oblique angle with respect to a forward axis. A waveguide in fluid communication with the up-firing transducer includes a sidewall extending circumferentially around the transducer, the sidewall having a first end adjacent the up-firing transducer and a second end adjacent the outer perimeter, such that an opening defined by the sidewall has a larger area at the second end than at the first end. A rear portion of the sidewall is more steeply angled with respect to the axis than a forward portion of the sidewall.

18 Claims, 14 Drawing Sheets

Related U.S. Application Data

(60) Provisional application No. 62/978,743, filed on Feb. 19, 2020.

(51) Int. Cl.

| | |
|---|---|
| ***H04R 1/26*** | (2006.01) |
| ***H04R 3/12*** | (2006.01) |
| ***H04R 7/12*** | (2006.01) |
| ***H04R 7/16*** | (2006.01) |

(56) References Cited

U.S. PATENT DOCUMENTS

| | | | | |
|---|---|---|---|---|
| 5,923,902 | A | 7/1999 | Inagaki | |
| 6,032,202 | A | 2/2000 | Lea et al. | |
| 6,059,069 | A * | 5/2000 | Hughes .................. | H04R 1/345 181/182 |
| 6,256,554 | B1 | 7/2001 | DiLorenzo | |
| 6,404,811 | B1 | 6/2002 | Cvetko et al. | |
| 6,469,633 | B1 | 10/2002 | Wachter | |
| 6,522,886 | B1 | 2/2003 | Youngs et al. | |
| 6,611,537 | B1 | 8/2003 | Edens et al. | |
| 6,631,410 | B1 | 10/2003 | Kowalski et al. | |
| 6,757,517 | B2 | 6/2004 | Chang | |
| 6,778,869 | B2 | 8/2004 | Champion | |
| 7,130,608 | B2 | 10/2006 | Hollstrom et al. | |
| 7,130,616 | B2 | 10/2006 | Janik | |
| 7,143,939 | B2 | 12/2006 | Henzerling | |
| 7,236,773 | B2 | 6/2007 | Thomas | |
| 7,275,621 | B1 * | 10/2007 | Delgado, Jr. .......... | H04R 1/403 181/150 |
| 7,295,548 | B2 | 11/2007 | Blank et al. | |
| 7,391,791 | B2 | 6/2008 | Balassanian et al. | |
| 7,483,538 | B2 | 1/2009 | McCarty et al. | |
| 7,571,014 | B1 | 8/2009 | Lambourne et al. | |
| 7,630,501 | B2 | 12/2009 | Blank et al. | |
| 7,643,894 | B2 | 1/2010 | Braithwaite et al. | |
| 7,657,910 | B1 | 2/2010 | McAulay et al. | |
| 7,853,341 | B2 | 12/2010 | McCarty et al. | |
| 7,987,294 | B2 | 7/2011 | Bryce et al. | |
| 8,014,423 | B2 | 9/2011 | Thaler et al. | |
| 8,045,952 | B2 | 10/2011 | Qureshey et al. | |
| 8,103,009 | B2 | 1/2012 | McCarty et al. | |
| 8,234,395 | B2 | 7/2012 | Millington | |
| 8,483,853 | B1 | 7/2013 | Lambourne | |
| 8,942,252 | B2 | 1/2015 | Balassanian et al. | |
| 2001/0042107 | A1 | 11/2001 | Palm | |
| 2002/0022453 | A1 | 2/2002 | Balog et al. | |
| 2002/0026442 | A1 | 2/2002 | Lipscomb et al. | |
| 2002/0124097 | A1 | 9/2002 | Isely et al. | |
| 2003/0157951 | A1 | 8/2003 | Hasty, Jr. | |
| 2004/0024478 | A1 | 2/2004 | Hans et al. | |
| 2007/0142944 | A1 | 6/2007 | Goldberg et al. | |
| 2010/0278368 | A1 * | 11/2010 | Martin ..................... | H04R 1/30 438/712 |
| 2015/0189439 | A1 | 7/2015 | Starobin | |
| 2017/0325019 | A1 * | 11/2017 | Bezzola ................. | H04R 1/345 |
| 2020/0221217 | A1 * | 7/2020 | Kim ....................... | H04R 1/026 |

OTHER PUBLICATIONS

AudioTron Reference Manual, Version 3.0, May 2002, 70 pages.
AudioTron Setup Guide, Version 3.0, May 2002, 38 pages.
Bluetooth. “Specification of the Bluetooth System: The ad hoc Scatternet for affordable and highly functional wireless connectivity,” Core, Version 1.0 A, Jul. 26, 1999, 1068 pages.
Bluetooth. “Specification of the Bluetooth System: Wireless connections made easy,” Core, Version 1.0 B, Dec. 1, 1999, 1076 pages.
Dell, Inc. “Dell Digital Audio Receiver: Reference Guide,” Jun. 2000, 70 pages.
Dell, Inc. “Start Here,” Jun. 2000, 2 pages.
“Denon 2003-2004 Product Catalog,” Denon, 2003-2004, 44 pages.
Jo et al., “Synchronized One-to-many Media Streaming with Adaptive Playout Control,” Proceedings of SPIE, 2002, pp. 71-82, vol. 4861.
Jones, Stephen, “Dell Digital Audio Receiver: Digital upgrade for your analog stereo,” Analog Stereo, Jun. 24, 2000 http://www.reviewsonline.com/articles/961906864.htm retrieved Jun. 18, 2014, 2 pages.
Louderback, Jim, “Affordable Audio Receiver Furnishes Homes With MP3,” TechTV Vault. Jun. 28, 2000 retrieved Jul. 10, 2014, 2 pages.
Non-Final Office Action dated May 4, 2022, issued in connection with U.S. Appl. No. 17/249,029, filed Feb. 17, 2021, 12 pages.
Notice of Allowance dated Aug. 23, 2022, issued in connection with U.S. Appl. No. 17/249,029, filed Feb. 17, 2021, 7 pages.
Palm, Inc., “Handbook for the Palm VII Handheld,” May 2000, 311 pages.
Presentations at WinHEC 2000, May 2000, 138 pages.
Restriction Requirement dated Feb. 28, 2022, issued in connection with U.S. Appl. No. 17/249,029, filed Feb. 17, 2021, 5 pages.
U.S. Appl. No. 60/490,768, filed Jul. 28, 2003, entitled “Method for synchronizing audio playback between multiple networked devices,” 13 pages.
U.S. Appl. No. 60/825,407, filed Sep. 12, 2006, entitled “Controlling and manipulating groupings in a multi-zone music or media system,” 82 pages.
UPnP; “Universal Plug and Play Device Architecture,” Jun. 8, 2000; version 1.0; Microsoft Corporation; pp. 1-54.
Yamaha DME 64 Owner’s Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

ACOUSTIC WAVEGUIDES FOR MULTI-CHANNEL PLAYBACK DEVICES

CROSS-REFERENCE TO RELATED APPLICATIONS

The present application is a division of U.S. patent application Ser. No. 17/249,029, filed Feb. 17, 2021, which claims the benefit of priority to U.S. Patent Application No. 62/978,743, filed Feb. 19, 2020, which are incorporated herein by reference in their entireties.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, embodiments, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

Figure 1A:
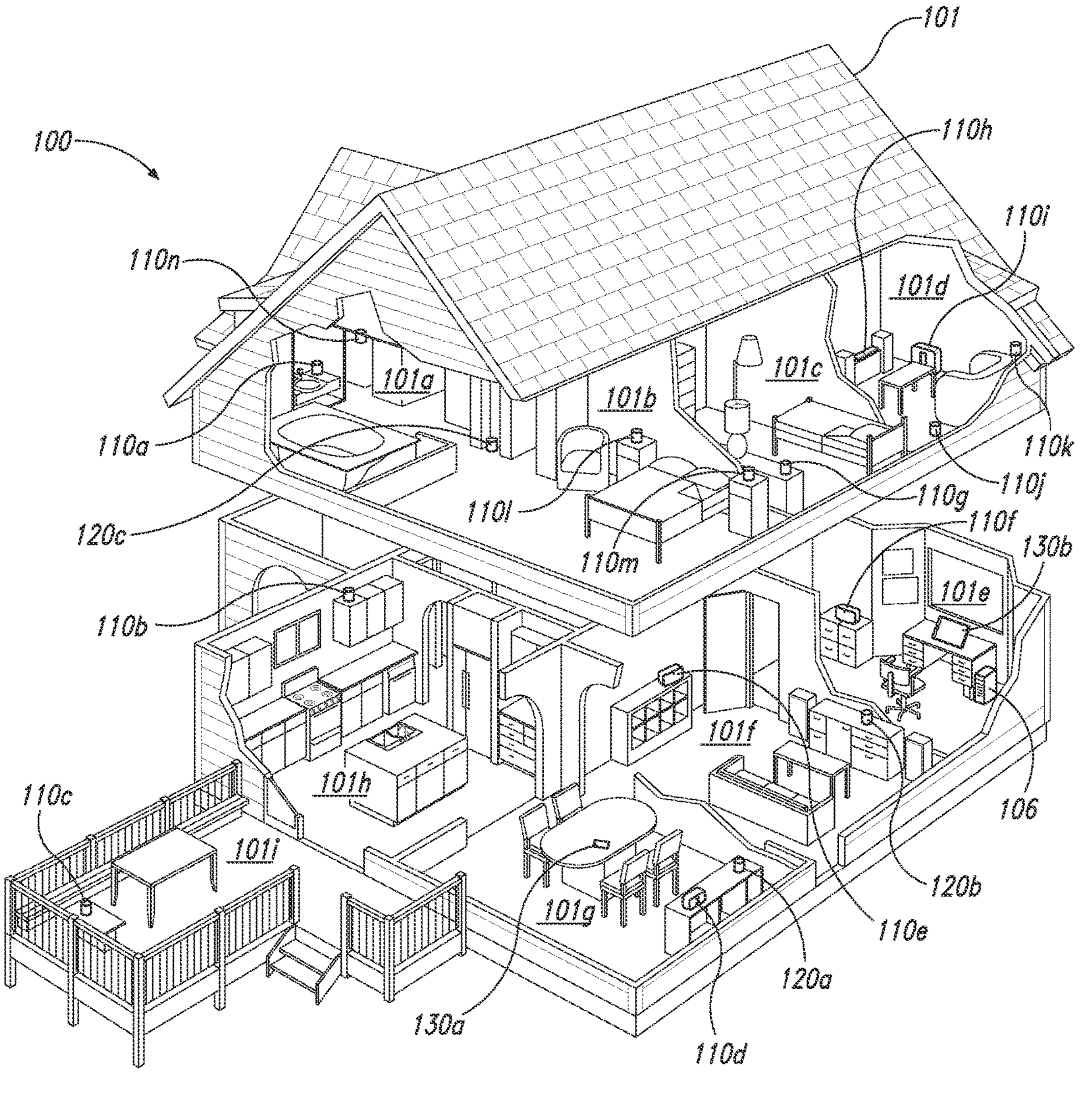
FIG. 1A is a partial cutaway view of an environment having a media playback system configured in accordance with embodiments of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

Conventional surround sound audio rendering formats include a plurality of channels configured to represent different lateral positions with respect to a listener (e.g., front, right, left). More recently, three-dimensional (3D) or other immersive audio rendering formats have been developed that include one or more vertical channels in addition to any lateral channels. Examples of such 3D audio formats include DOLBY ATMOS, MPEG-H, and DTS:X formats. Such 3D audio rendering formats may include one or more vertical channels configured to represent sounds originating from above a listener. In some instances, such vertical channels can be played back via transducers positioned over a listener's head (e.g., ceiling mounted speakers). In the case of soundbars or other multi-transducer devices, an upwardly oriented transducer (herein referred to as an "up-firing transducer") can output audio along a sound axis that is at least partially vertically oriented with respect to a forward horizontal plane of a playback device. This audio output can reflect off an acoustically reflective surface (e.g., a ceiling) to be directed toward a listener at a target location. Because the listener perceives the audio as originating from the point of reflection on the ceiling, the psychoacoustic perception is that the sound originates above the listener.

For up-firing transducers to usefully enable a listener to localize a sound overhead, the transducer must have a relatively high directionality. If the audio output is insufficiently directional, at least some output may "leak" along the horizontal direction, such that the listener localizes the transducer as the source of the sound, thereby reducing the psychoacoustic perception of the sound as originating above the listener. Acoustic waveguides can be used to enhance directionality of a transducer. An acoustic waveguide typically takes the form of a horn-shaped element in fluid communication with the transducer, for example with the transducer placed at its apex and an aperture on an opposing end. Acoustic output from the transducer is reflected off the sidewalls of the waveguide, thereby limiting dispersion and enhancing directivity. The precise geometry of the waveguide determines the particular acoustic dispersion pattern that can be achieved. However, certain playback devices, such as soundbars, may have dimensions, shapes, or other physical parameters that render the use of conventional waveguides more difficult. For example, curved outer surfaces can significantly complicate waveguide design. A slim cross-sectional profile, which is typically preferred in soundbar design, may similarly present design obstacles for acoustic waveguides.

Embodiments of the disclosed technology may address these and other problems by providing an acoustic waveguide in fluid communication with an up-firing transducer. The waveguide can have sidewall geometries that both accommodate the perimeter of the playback device (e.g., a soundbar), while also providing a sufficiently tall front portion that horizontal leakage can be reduced or minimized. In some embodiments, lateral dispersion (e.g., left and right directions from the up-firing transducer) can be maintained or enhanced, thereby providing a wide soundstage while maintaining the vertical directionality desired for an up-firing transducer.

Similarly, acoustic waveguides can be usefully employed with side-firing transducers, in which a high lateral directionality is desired (e.g., limiting horizontal bleed of audio output) such that a listener perceives the sound as originating from a reflected point off a wall or other acoustically reflective surface. By coupling a side-firing transducer to an acoustic waveguide having a sufficiently deep throat (e.g., a forward sidewall portion that inhibits horizontal leakage), directionality and performance of side-firing transducers can be improved.

The geometry of certain playback devices such as soundbars can present other obstacles. For example, to accommodate the required electronic components and still maintain a sufficiently compact profile, the physical layout of particular transducers may deviate from conventional designs. In some embodiments, for example, a center transducer (e.g., a center tweeter) may be laterally offset from a center line of a playback device such as a soundbar. As described in more detail below, in some embodiments, the use of an off-set center tweeter or other transducer can facilitate a smaller playback device profile while accommodating the necessary electronic components to receive and process audio input and to drive the various transducers within the playback device.

Additional details regarding the use of multi-channel audio playback, including the sue of beam steering and/or acoustic reflection to achieve improved listener experience (e.g., improved directionality of acoustic output) can be found in U.S. Pat. No. 9,973,851, issued May 15, 2018; U.S. Pat. No. 9,794,710, issued Oct. 17, 2017, and U.S. Patent Application No. 62/940,640, filed Nov. 26, 2019, each of which is hereby incorporated by reference in its entirety.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

In the Figures, identical reference numbers identify generally similar, and/or identical, elements. To facilitate the discussion of any particular element, the most significant digit or digits of a reference number refers to the Figure in which that element is first introduced. For example, element 110*a* is first introduced and discussed with reference to FIG. 1A. Many of the details, dimensions, angles and other features shown in the Figures are merely illustrative of particular embodiments of the disclosed technology. Accordingly, other embodiments can have other details, dimensions, angles and features without departing from the spirit or scope of the disclosure. In addition, those of ordinary skill in the art will appreciate that further embodiments of the various disclosed technologies can be practiced without several of the details described below.

II. Suitable Operating Environment

FIG. 1A is a partial cutaway view of a media playback system 100 distributed in an environment 101 (e.g., a house). The media playback system 100 comprises one or more playback devices 110 (identified individually as playback devices 110*a-n*), one or more network microphone devices ("NMDs"), 120 (identified individually as NMDs 120*a-c*), and one or more control devices 130 (identified individually as control devices 130*a* and 130*b*).

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the media playback system 100 is configured to play back audio from a first playback device (e.g., the playback device 110*a*) in synchrony with a second playback device (e.g., the playback device 110*b*). Interactions between the playback devices 110, NMDs 120, and/or control devices 130 of the media playback system 100 configured in accordance with the various embodiments of the disclosure are described in greater detail below.

In the illustrated embodiment of FIG. 1A, the environment 101 comprises a household having several rooms, spaces, and/or playback zones, including (clockwise from upper left) a master bathroom 101*a*, a master bedroom 101*b*, a second bedroom 101*c*, a family room or den 101*d*, an office 101*e*, a living room 101*f*, a dining room 101*g*, a kitchen 101*h*, and an outdoor patio 101*i*. While certain embodiments and examples are described below in the context of a home environment, the technologies described herein may be implemented in other types of environments. In some embodiments, for example, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed to form, for example, the configuration shown in FIG. 1A. Each zone may be given a name according to a different room or space such as the office 101*e*, master bathroom 101*a*, master bedroom 101*b*, the second bedroom 101*c*, kitchen 101*h*, dining room 101*g*, living room 101*f*, and/or the balcony 101*i*. In some embodiments, a single playback zone may include multiple rooms or spaces. In certain embodiments, a single room or space may include multiple playback zones.

In the illustrated embodiment of FIG. 1A, the master bathroom 101*a*, the second bedroom 101*c*, the office 101*e*, the living room 101*f*, the dining room 101*g*, the kitchen 101*h*, and the outdoor patio 101*i* each include one playback device 110, and the master bedroom 101*b* and the den 101*d* include a plurality of playback devices 110. In the master bedroom 101*b*, the playback devices 110*l* and 110*m* may be configured, for example, to play back audio content in synchrony as individual ones of playback devices 110, as a bonded playback zone, as a consolidated playback device, and/or any combination thereof. Similarly, in the den 101*d*, the playback devices 110*h-j* can be configured, for instance, to play back audio content in synchrony as individual ones of playback devices 110, as one or more bonded playback devices, and/or as one or more consolidated playback devices. Additional details regarding bonded and consolidated playback devices are described below with respect to FIGS. 1B and 1E.

In some embodiments, one or more of the playback zones in the environment 101 may each be playing different audio content. For instance, a user may be grilling on the patio 101*i* and listening to hip hop music being played by the playback device 110*c* while another user is preparing food in the kitchen 101*h* and listening to classical music played by the playback device 110*b*. In another example, a playback zone may play the same audio content in synchrony with another playback zone. For instance, the user may be in the office 101*e* listening to the playback device 110*f* playing back the same hip-hop music being played back by playback device 110*c* on the patio 101*i*. In some embodiments, the playback devices 110*c* and 110*f* play back the hip hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

Figure 1B:
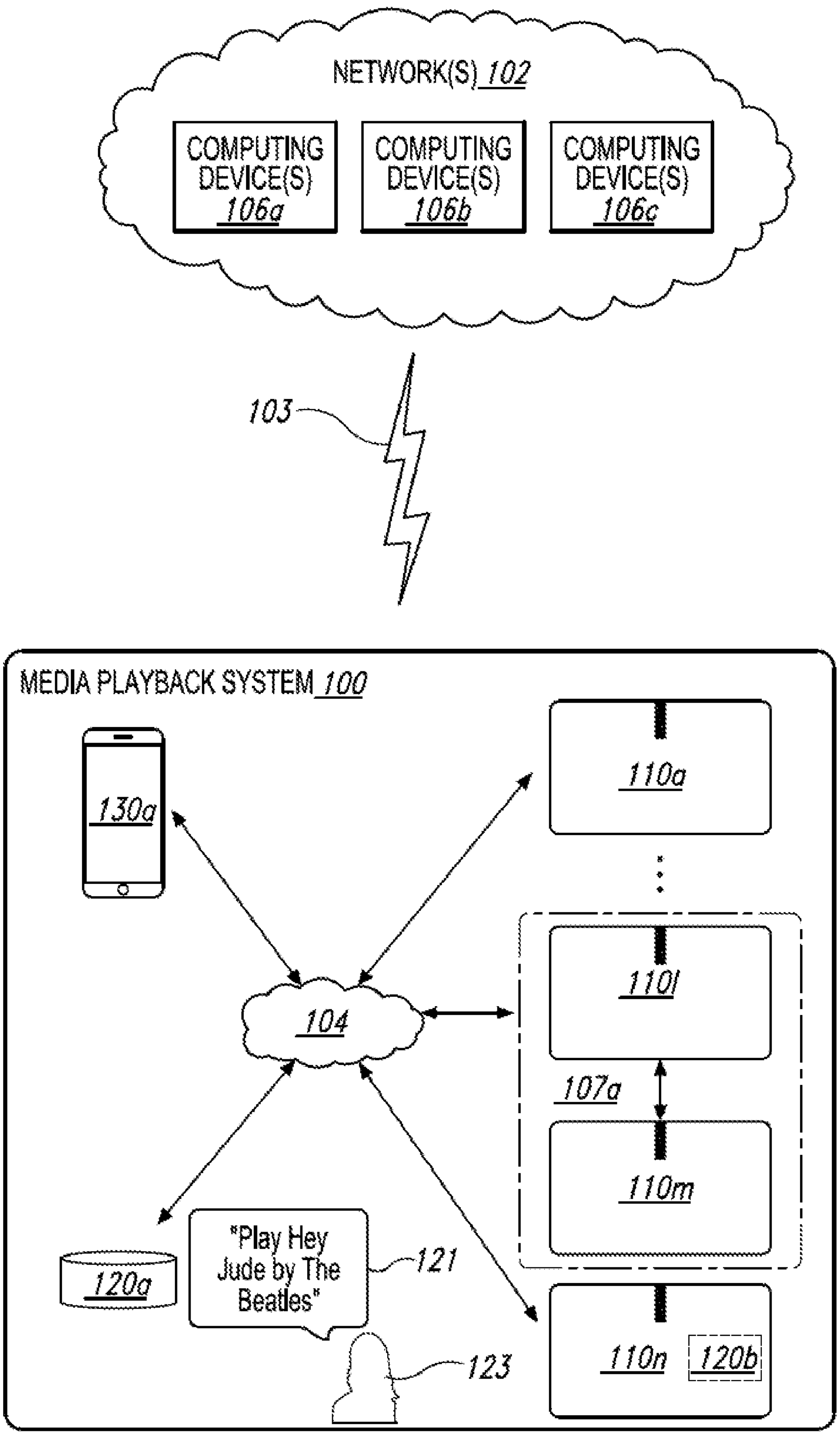
FIG. 1B is a schematic diagram of the media playback system of FIG. 1A and one or more networks.

FIG. 1B is a schematic diagram of the media playback system 100 and a cloud network 102. For ease of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication network networks, and/or other suitable data transmission protocol networks), etc. The cloud network 102 is configured to deliver media content (e.g., audio content, video content, photographs, social media content) to the media playback system 100 in response to a request transmitted from the media playback system 100 via the links 103. In some embodiments, the cloud network 102 is further configured to receive data (e.g. voice input data) from the media playback system 100 and correspondingly transmit commands and/or media content to the media playback system 100.

The cloud network 102 comprises computing devices 106 (identified separately as a first computing device 106*a*, a second computing device 106*b*, and a third computing device 106*c*). The computing devices 106 can comprise individual computers or servers, such as, for example, a media streaming service server storing audio and/or other media content, a voice service server, a social media server, a media playback system control server, etc. In some embodiments, one or more of the computing devices 106 comprise modules of a single computer or server. In certain embodiments, one or more of the computing devices 106 comprise one or more modules, computers, and/or servers. Moreover, while the cloud network 102 is described above in the context of a single cloud network, in some embodiments the cloud network 102 comprises a plurality of cloud networks comprising communicatively coupled computing devices. Furthermore, while the cloud network 102 is shown in FIG. 1B as having three of the computing devices 106, in some embodiments, the cloud network 102 comprises fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WiFi network, a Bluetooth, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WiFi" can refer to several different communication protocols including, for example, Institute of Electrical and Electronics Engineers (IEEE) 802.11a, 802.11b, 802.11g, 802.11n, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHz, and/or another suitable frequency.

In some embodiments, the network 104 comprises a dedicated communication network that the media playback system 100 uses to transmit messages between individual devices and/or to transmit media content to and from media content sources (e.g., one or more of the computing devices 106). In certain embodiments, the network 104 is configured to be accessible only to devices in the media playback system 100, thereby reducing interference and competition with other household devices. In other embodiments, however, the network 104 comprises an existing household communication network (e.g., a household WiFi network). In some embodiments, the links 103 and the network 104 comprise one or more of the same networks. In some embodiments, for example, the links 103 and the network 104 comprise a telecommunication network (e.g., an LTE network, a 5G network). Moreover, in some embodiments, the media playback system 100 is implemented without the network 104, and devices comprising the media playback system 100 can communicate with each other, for example, via one or more direct connections, PANs, telecommunication networks, and/or other suitable communication links.

In some embodiments, audio content sources may be regularly added or removed from the media playback system 100. In some embodiments, for example, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some embodiments, for example, the media content database is stored on one or more of the playback devices 110, network microphone devices 120, and/or control devices 130.

In the illustrated embodiment of FIG. 1B, the playback devices 110*l* and 110*m* comprise a group 107*a*. The playback devices 110*l* and 110*m* can be positioned in different rooms in a household and be grouped together in the group 107*a* on a temporary or permanent basis based on user input received at the control device 130*a* and/or another control device 130 in the media playback system 100. When arranged in the group 107*a*, the playback devices 110*l* and 110*m* can be configured to play back the same or similar audio content in synchrony from one or more audio content sources. In certain embodiments, for example, the group 107*a* comprises a bonded zone in which the playback devices 110*l* and 110*m* comprise left audio and right audio channels, respectively, of multi-channel audio content, thereby producing or enhancing a stereo effect of the audio content. In some embodiments, the group 107*a* includes additional playback devices 110. In other embodiments, however, the media playback system 100 omits the group 107*a* and/or other grouped arrangements of the playback devices 110.

The media playback system 100 includes the NMDs 120*a* and 120*d*, each comprising one or more microphones configured to receive voice utterances from a user. In the illustrated embodiment of FIG. 1B, the NMD 120*a* is a standalone device and the NMD 120*d* is integrated into the playback device 110*n*. The NMD 120*a*, for example, is configured to receive voice input 121 from a user 123. In some embodiments, the NMD 120*a* transmits data associated with the received voice input 121 to a voice assistant service (VAS) configured to (i) process the received voice input data and (ii) transmit a corresponding command to the media playback system 100. In some embodiments, for example, the computing device 106*c* comprises one or more modules and/or servers of a VAS (e.g., a VAS operated by one or more of SONOS®, AMAZON®, GOOGLE® APPLE®, MICROSOFT®). The computing device 106*c* can receive the voice input data from the NMD 120*a* via the network 104 and the links 103. In response to receiving the voice input data, the computing device 106*c* processes the voice input data (i.e., "Play Hey Jude by The Beatles"), and determines that the processed voice input includes a command to play a song (e.g., "Hey Jude"). The computing device 106*c* accordingly transmits commands to the media playback system 100 to play back "Hey Jude" by the Beatles from a suitable media service (e.g., via one or more of the computing devices 106) on one or more of the playback devices 110.

b. Suitable Playback Devices

Figure 1C:
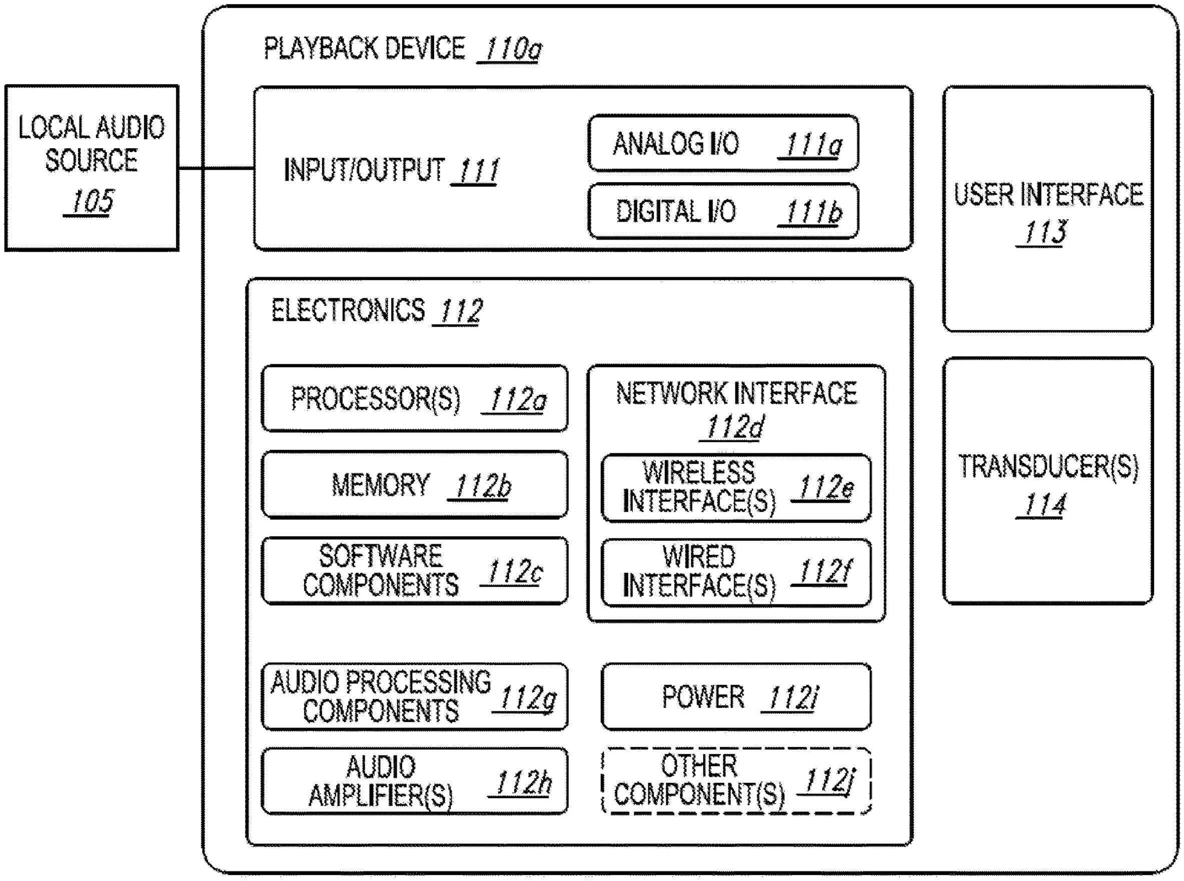
FIG. 1C is a block diagram of a playback device.

FIG. 1C is a block diagram of the playback device 110*a* comprising an input/output 111. The input/output 111 can include an analog I/O 111*a* (e.g., one or more wires, cables, and/or other suitable communication links configured to carry analog signals) and/or a digital I/O 111*b* (e.g., one or more wires, cables, or other suitable communication links configured to carry digital signals). In some embodiments, the analog I/O 111*a* is an audio line-in input connection comprising, for example, an auto-detecting 3.5 mm audio line-in connection. In some embodiments, the digital I/O 111*b* comprises a Sony/Philips Digital Interface Format (S/PDIF) communication interface and/or cable and/or a Toshiba Link (TOSLINK) cable. In some embodiments, the digital I/O 111*b* comprises a High-Definition Multimedia Interface (HDMI) interface and/or cable. In some embodiments, the digital I/O 111*b* includes one or more wireless communication links comprising, for example, a radio frequency (RF), infrared, WiFi, Bluetooth, or another suitable communication protocol. In certain embodiments, the analog I/O 111*a* and the digital 111*b* comprise interfaces (e.g., ports, plugs, jacks) configured to receive connectors of cables transmitting analog and digital signals, respectively, without necessarily including cables.

The playback device 110*a*, for example, can receive media content (e.g., audio content comprising music and/or other sounds) from a local audio source 105 via the input/output 111 (e.g., a cable, a wire, a PAN, a Bluetooth connection, an ad hoc wired or wireless communication network, and/or another suitable communication link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some embodiments, the local audio source 105 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 105. In other embodiments, however, the media playback system omits the local audio source 105 altogether. In some embodiments, the playback device 110*a* does not include an input/output 111 and receives all audio content via the network 104.

The playback device 110*a* further comprises electronics 112, a user interface 113 (e.g., one or more buttons, knobs, dials, touch-sensitive surfaces, displays, touchscreens), and one or more transducers 114 (referred to hereinafter as "the transducers 114"). The electronics 112 is configured to receive audio from an audio source (e.g., the local audio source 105) via the input/output 111, one or more of the computing devices 106*a-c* via the network 104 (FIG. 1B)), amplify the received audio, and output the amplified audio for playback via one or more of the transducers 114. In some embodiments, the playback device 110*a* optionally includes one or more microphones 115 (e.g., a single microphone, a plurality of microphones, a microphone array) (hereinafter referred to as "the microphones 115"). In certain embodiments, for example, the playback device 110*a* having one or more of the optional microphones 115 can operate as an NMD configured to receive voice input from a user and correspondingly perform one or more operations based on the received voice input.

In the illustrated embodiment of FIG. 1C, the electronics 112 comprise one or more processors 112*a* (referred to hereinafter as "the processors 112*a*"), memory 112*b*, software components 112*c*, a network interface 112*d*, one or more audio processing components 112*g* (referred to hereinafter as "the audio components 112*g*"), one or more audio amplifiers 112*h* (referred to hereinafter as "the amplifiers 112*h*"), and power 112*i* (e.g., one or more power supplies, power cables, power receptacles, batteries, induction coils, Power-over Ethernet (POE) interfaces, and/or other suitable sources of electric power). In some embodiments, the electronics 112 optionally include one or more other components 112*j* (e.g., one or more sensors, video displays, touchscreens, battery charging bases).

The processors 112*a* can comprise clock-driven computing component(s) configured to process data, and the memory 112*b* can comprise a computer-readable medium (e.g., a tangible, non-transitory computer-readable medium, data storage loaded with one or more of the software components 112*c*) configured to store instructions for performing various operations and/or functions. The processors 112*a* are configured to execute the instructions stored on the memory 112*b* to perform one or more of the operations. The operations can include, for example, causing the playback device 110*a* to retrieve audio data from an audio source (e.g., one or more of the computing devices 106*a-c* (FIG. 1B)), and/or another one of the playback devices 110. In some embodiments, the operations further include causing the playback device 110*a* to send audio data to another one of the playback devices 110*a* and/or another device (e.g., one of the NMDs 120). Certain embodiments include operations causing the playback device 110*a* to pair with another of the one or more playback devices 110 to enable a multi-channel audio environment (e.g., a stereo pair, a bonded zone).

The processors 112*a* can be further configured to perform operations causing the playback device 110*a* to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110*a* and the other one or more other playback devices 110. Additional details regarding audio playback synchronization among playback devices can be found, for example, in U.S. Pat. No. 8,234,395, which was incorporated by reference above.

In some embodiments, the memory 112*b* is further configured to store data associated with the playback device 110*a*, such as one or more zones and/or zone groups of which the playback device 110*a* is a member, audio sources accessible to the playback device 110*a*, and/or a playback queue that the playback device 110*a* (and/or another of the one or more playback devices) can be associated with. The stored data can comprise one or more state variables that are periodically updated and used to describe a state of the playback device 110*a*. The memory 112*b* can also include data associated with a state of one or more of the other devices (e.g., the playback devices 110, NMDs 120, control devices 130) of the media playback system 100. In some embodiments, for example, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112*d* is configured to facilitate a transmission of data between the playback device 110*a* and one or more other devices on a data network such as, for example, the links 103 and/or the network 104 (FIG. 1B). The network interface 112*d* is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112*d* can parse the digital packet data such that the electronics 112 properly receives and processes the data destined for the playback device 110*a*.

In the illustrated embodiment of FIG. 1C, the network interface 112*d* comprises one or more wireless interfaces 112*e* (referred to hereinafter as "the wireless interface 112*e*"). The wireless interface 112*e* (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WiFi, Bluetooth, LTE). In some embodiments, the network interface 112*d* optionally includes a wired interface 112*f* (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112*d* includes the wired interface 112*f* and excludes the wireless interface 112*e*. In some embodiments, the electronics 112 excludes the network interface 112*d* altogether and transmits and receives media content and/or other data via another communication path (e.g., the input/output 111).

The audio components 112*g* are configured to process and/or filter data comprising media content received by the electronics 112 (e.g., via the input/output 111 and/or the network interface 112*d*) to produce output audio signals. In some embodiments, the audio processing components 112*g* comprise, for example, one or more digital-to-analog converters (DAC), audio preprocessing components, audio enhancement components, a digital signal processors (DSPs), and/or other suitable audio processing components, modules, circuits, etc. In certain embodiments, one or more of the audio processing components 112*g* can comprise one or more subcomponents of the processors 112*a*. In some embodiments, the electronics 112 omits the audio processing components 112*g*. In some embodiments, for example, the processors 112*a* execute instructions stored on the memory 112*b* to perform audio processing operations to produce the output audio signals.

The amplifiers 112*h* are configured to receive and amplify the audio output signals produced by the audio processing components 112*g* and/or the processors 112*a*. The amplifiers 112*h* can comprise electronic devices and/or components configured to amplify audio signals to levels sufficient for driving one or more of the transducers 114. In some embodiments, for example, the amplifiers 112*h* include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112*h* comprise a suitable combination of two or more of the foregoing types of power amplifiers. Moreover, in some embodiments, individual ones of the amplifiers 112*h* correspond to individual ones of the transducers 114. In other embodiments, however, the electronics 112 includes a single one of the amplifiers 112*h* configured to output amplified audio signals to a plurality of the transducers 114. In some other embodiments, the electronics 112 omits the amplifiers 112*h*.

The transducers 114 (e.g., one or more speakers and/or speaker drivers) receive the amplified audio signals from the amplifier 112*h* and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

Figure 1D:
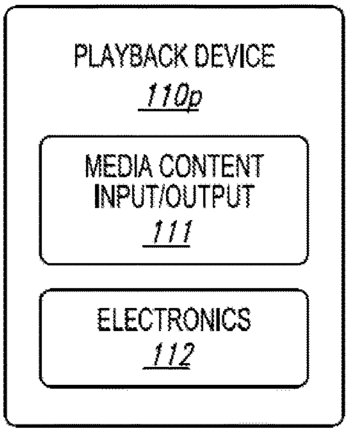
FIG. 1D is a block diagram of a playback device.

By way of illustration, SONOS, Inc. presently offers (or has offered) for sale certain playback devices including, for example, a "SONOS ONE," "MOVE," "PLAY:5," "BEAM," "PLAYBAR," "PLAYBASE," "PORT," "BOOST," "AMP," and "SUB." Other suitable playback devices may additionally or alternatively be used to implement the playback devices of example embodiments disclosed herein. Additionally, one of ordinary skilled in the art will appreciate that a playback device is not limited to the examples described herein or to SONOS product offerings. In some embodiments, for example, one or more playback devices 110 comprises wired or wireless headphones (e.g., over-the-ear headphones, on-ear headphones, in-ear earphones). In other embodiments, one or more of the playback devices 110 comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device omits a user interface and/or one or more transducers. For example, FIG. 1D is a block diagram of a playback device 110*p* comprising the input/output 111 and electronics 112 without the user interface 113 or transducers 114.

Figure 1E:
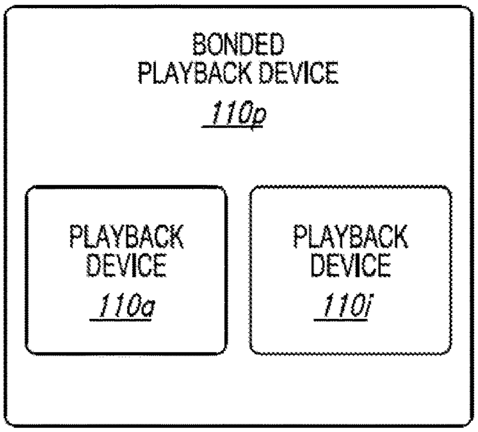
FIG. 1E is a block diagram of a network microphone device.

FIG. 1E is a block diagram of a bonded playback device 110*q* comprising the playback device 110*a* (FIG. 1C) sonically bonded with the playback device 110*i* (e.g., a subwoofer) (FIG. 1A). In the illustrated embodiment, the playback devices 110*a* and 110*i* are separate ones of the playback devices 110 housed in separate enclosures. In some embodiments, however, the bonded playback device 110*q* comprises a single enclosure housing both the playback devices 110*a* and 110*i*. The bonded playback device 110*q* can be configured to process and reproduce sound differently than an unbonded playback device (e.g., the playback device 110*a* of FIG. 1C) and/or paired or bonded playback devices (e.g., the playback devices 110*l* and 110*m* of FIG. 1B). In some embodiments, for example, the playback device 110*a* is full-range playback device configured to render low frequency, mid-range frequency, and high frequency audio content, and the playback device 110*i* is a subwoofer configured to render low frequency audio content. In some embodiments, the playback device 110*a*, when bonded with the first playback device, is configured to render only the mid-range and high frequency components of a particular audio content, while the playback device 110*i* renders the low frequency component of the particular audio content. In some embodiments, the bonded playback device 110*q* includes additional playback devices and/or another bonded playback device. Additional playback device embodiments are described in further detail below with respect to FIGS. 2A-2C.

c. Suitable Network Microphone Devices (NMDs)

Figure 1F:
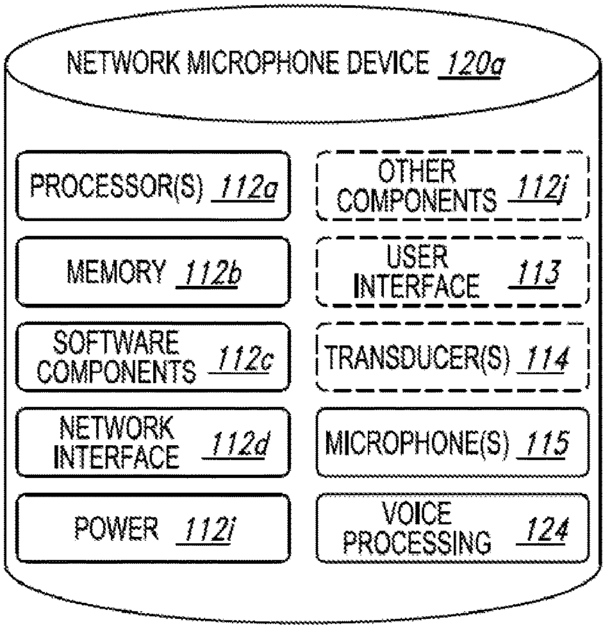
FIG. 1F is a block diagram of a network microphone device.

FIG. 1F is a block diagram of the NMD 120*a* (FIGS. 1A and 1B). The NMD 120*a* includes one or more voice processing components 124 (hereinafter "the voice components 124") and several components described with respect to the playback device 110*a* (FIG. 1C) including the processors 112*a*, the memory 112*b*, and the microphones 115. The NMD 120*a* optionally comprises other components also included in the playback device 110*a* (FIG. 1C), such as the user interface 113 and/or the transducers 114. In some embodiments, the NMD 120*a* is configured as a media playback device (e.g., one or more of the playback devices 110), and further includes, for example, one or more of the audio components 112*g* (FIG. 1C), the amplifiers 114, and/or other playback device components. In certain embodiments, the NMD 120*a* comprises an Internet of Things (IoT) device such as, for example, a thermostat, alarm panel, fire and/or smoke detector, etc. In some embodiments, the NMD 120*a* comprises the microphones 115, the voice processing components 124, and only a portion of the components of the electronics 112 described above with respect to FIG. 1B. In some embodiments, for example, the NMD 120*a* includes the processor 112*a* and the memory 112*b* (FIG. 1B), while omitting one or more other components of the electronics 112. In some embodiments, the NMD 120*a* includes additional components (e.g., one or more sensors, cameras, thermometers, barometers, hygrometers).

Figure 1G:
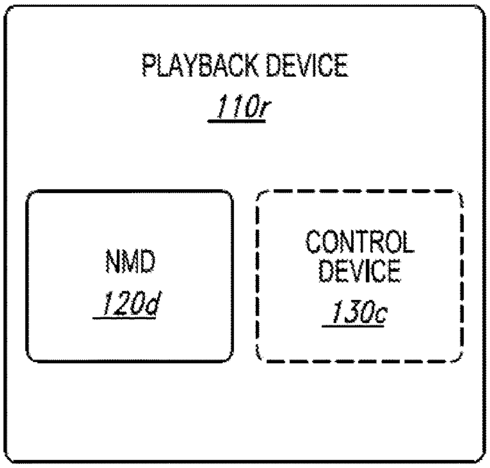
FIG. 1G is a block diagram of a playback device.

In some embodiments, an NMD can be integrated into a playback device. FIG. 1G is a block diagram of a playback device 110*r* comprising an NMD 120*d*. The playback device 110*r* can comprise many or all of the components of the playback device 110*a* and further include the microphones 115 and voice processing components 124 (FIG. 1F). The playback device 110*r* optionally includes an integrated control device 130*c*. The control device 130*c* can comprise, for example, a user interface (e.g., the user interface 113 of FIG. 1B) configured to receive user input (e.g., touch input, voice input) without a separate control device. In other embodiments, however, the playback device 110*r* receives commands from another control device (e.g., the control device 130*a* of FIG. 1B).

Referring again to FIG. 1F, the microphones 115 are configured to acquire, capture, and/or receive sound from an environment (e.g., the environment 101 of FIG. 1A) and/or a room in which the NMD 120*a* is positioned. The received sound can include, for example, vocal utterances, audio played back by the NMD 120*a* and/or another playback device, background voices, ambient sounds, etc. The microphones 115 convert the received sound into electrical signals to produce microphone data. The voice processing components 124 receive and analyzes the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word “Alexa.” Other examples include “Ok, Google” for invoking the GOOGLE® VAS and “Hey, Siri” for invoking the APPLE® VAS.

After detecting the activation word, voice processing components 124 monitor the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word “Alexa” followed by the utterance “set the thermostat to 68 degrees” to set a temperature in a home (e.g., the environment 101 of FIG. 1A). The user might speak the same activation word followed by the utterance “turn on the living room” to turn on illumination devices in a living room area of the home. The user may similarly speak an activation word followed by a request to play a particular song, an album, or a playlist of music on a playback device in the home.

d. Suitable Control Devices

Figure 1H:
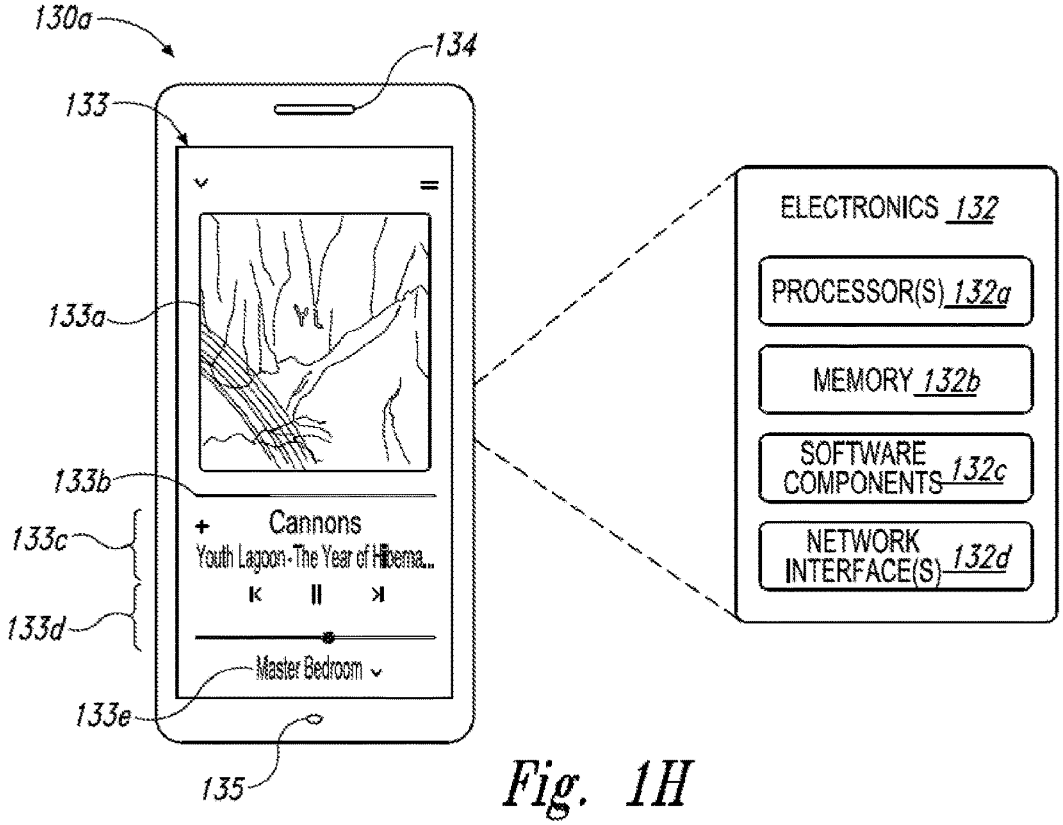
FIG. 1H is a partially schematic diagram of a control device.

FIG. 1H is a partially schematic diagram of the control device 130*a* (FIGS. 1A and 1B). As used herein, the term “control device” can be used interchangeably with “controller” or “control system.” Among other features, the control device 130*a* is configured to receive user input related to the media playback system 100 and, in response, cause one or more devices in the media playback system 100 to perform an action(s) or operation(s) corresponding to the user input. In the illustrated embodiment, the control device 130*a* comprises a smartphone (e.g., an iPhone™, an Android phone) on which media playback system controller application software is installed. In some embodiments, the control device 130*a* comprises, for example, a tablet (e.g., an iPad™), a computer (e.g., a laptop computer, a desktop computer), and/or another suitable device (e.g., a television, an automobile audio head unit, an IoT device). In certain embodiments, the control device 130*a* comprises a dedicated controller for the media playback system 100. In other embodiments, as described above with respect to FIG. 1G, the control device 130*a* is integrated into another device in the media playback system 100 (e.g., one more of the playback devices 110, NMDs 120, and/or other suitable devices configured to communicate over a network).

The control device 130*a* includes electronics 132, a user interface 133, one or more speakers 134, and one or more microphones 135. The electronics 132 comprise one or more processors 132*a* (referred to hereinafter as “the processors 132*a*”), a memory 132*b*, software components 132*c*, and a network interface 132*d*. The processor 132*a* can be configured to perform functions relevant to facilitating user access, control, and configuration of the media playback system 100. The memory 132*b* can comprise data storage that can be loaded with one or more of the software components executable by the processor 132*a* to perform those functions. The software components 132*c* can comprise applications and/or other executable software configured to facilitate control of the media playback system 100. The memory 112*b* can be configured to store, for example, the software components 132*c*, media playback system controller application software, and/or other data associated with the media playback system 100 and the user.

The network interface 132*d* is configured to facilitate network communications between the control device 130*a* and one or more other devices in the media playback system 100, and/or one or more remote devices. In some embodiments, the network interface 132*d* is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132*d* can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132*d* can transmit a playback device control command (e.g., volume control, audio playback control, audio content selection) from the control device 130 to one or more of the playback devices 110. The network interface 132*d* can also transmit and/or receive configuration changes such as, for example, adding/removing one or more playback devices 110 to/from a zone, adding/removing one or more zones to/from a zone group, forming a bonded or consolidated player, separating one or more playback devices from a bonded or consolidated player, among others.

The user interface 133 is configured to receive user input and can facilitate 'control of the media playback system 100. The user interface 133 includes media content art 133*a* (e.g., album art, lyrics, videos), a playback status indicator 133*b* (e.g., an elapsed and/or remaining time indicator), media content information region 133*c*, a playback control region 133*d*, and a zone indicator 133*e*. The media content information region 133*c* can include a display of relevant information (e.g., title, artist, album, genre, release year) about media content currently playing and/or media content in a queue or playlist. The playback control region 133*d* can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133*d* may also include selectable icons to modify equalization settings, playback volume, and/or other suitable playback actions. In the illustrated embodiment, the user interface 133 comprises a display presented on a touch screen interface of a smartphone (e.g., an iPhone™, an Android phone). In some embodiments, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130*a*. In some embodiments, the one or more speakers comprise individual transducers configured to correspondingly output low frequencies, mid-range frequencies, and/or high frequencies. In some embodiments, for example, the control device 130*a* is configured as a playback device (e.g., one of the playback devices 110). Similarly, in some embodiments the control device 130*a* is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130*a* is configured to operate as playback device and an NMD. In other embodiments, however, the control device 130*a* omits the one or more speakers 134 and/or the one or more microphones 135. For instance, the control device 130*a* may comprise a device (e.g., a thermostat, an IoT device, a network device) comprising a portion of the electronics 132 and the user interface 133 (e.g., a touch screen) without any speakers or microphones.

III. Example Systems and Devices

Figure 2A:
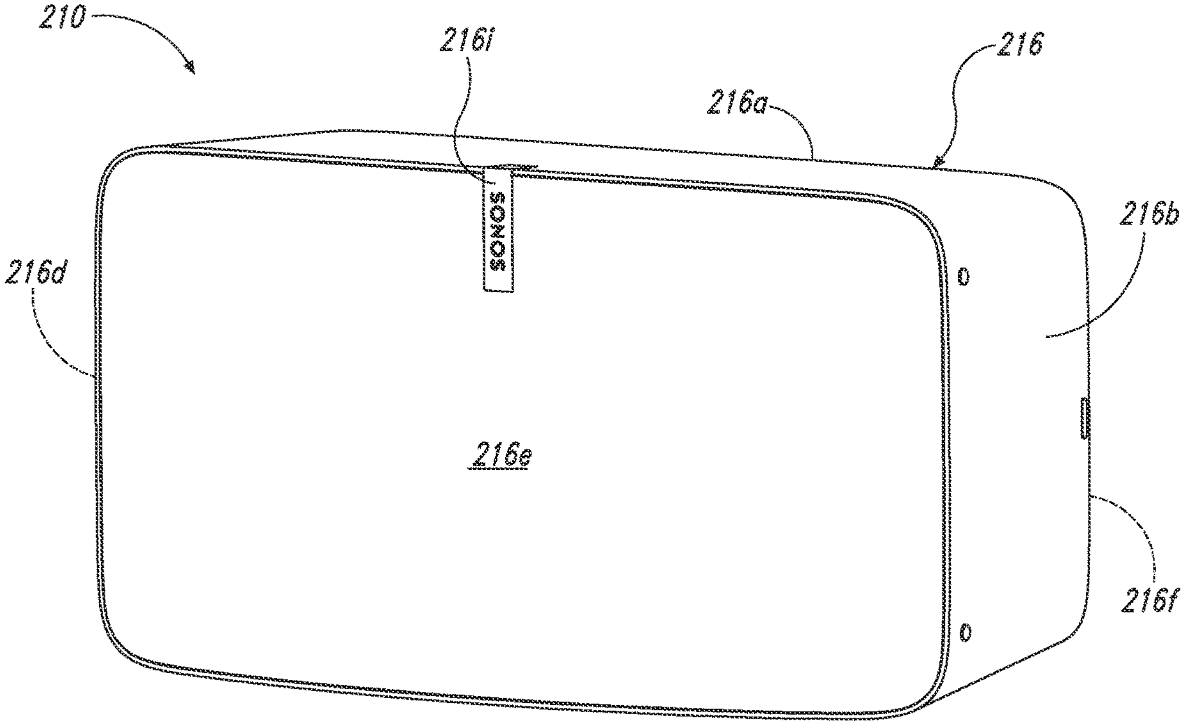
FIG. 2A is a front isometric view of a playback device configured in accordance with embodiments of the disclosed technology.
Figure 2B:
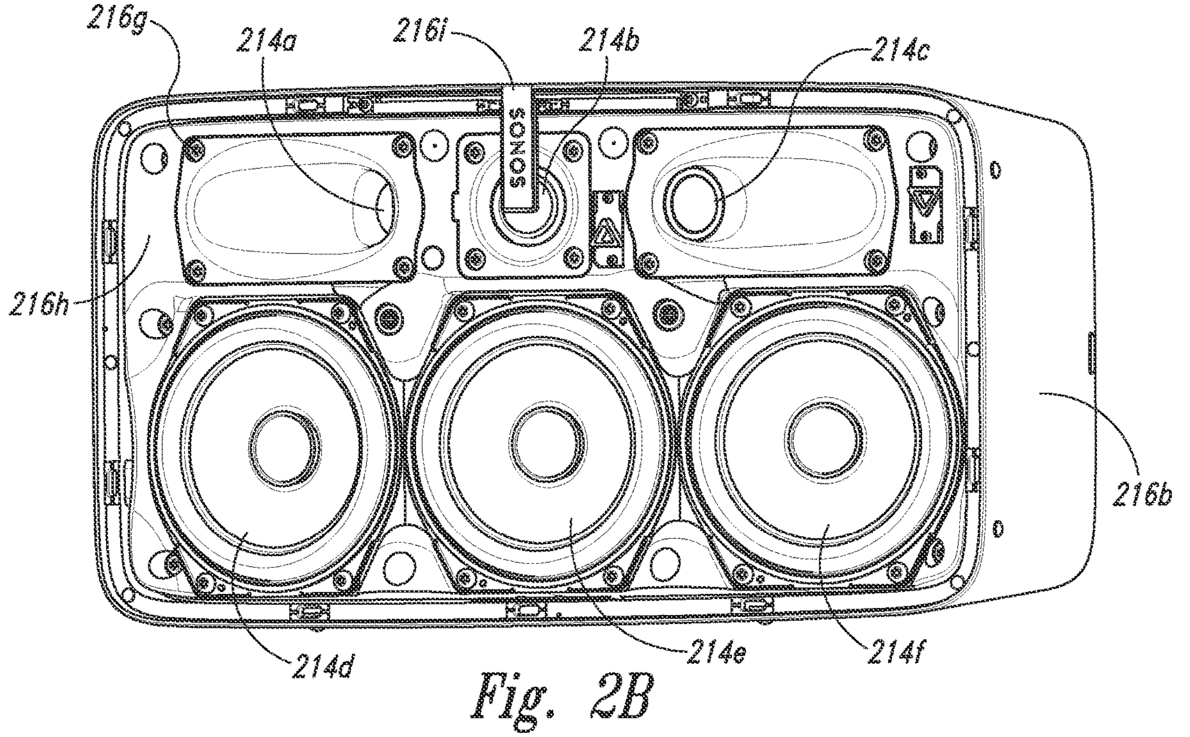
FIG. 2B is a front isometric view of the playback device of FIG. 3A without a grille.
Figure 2C:
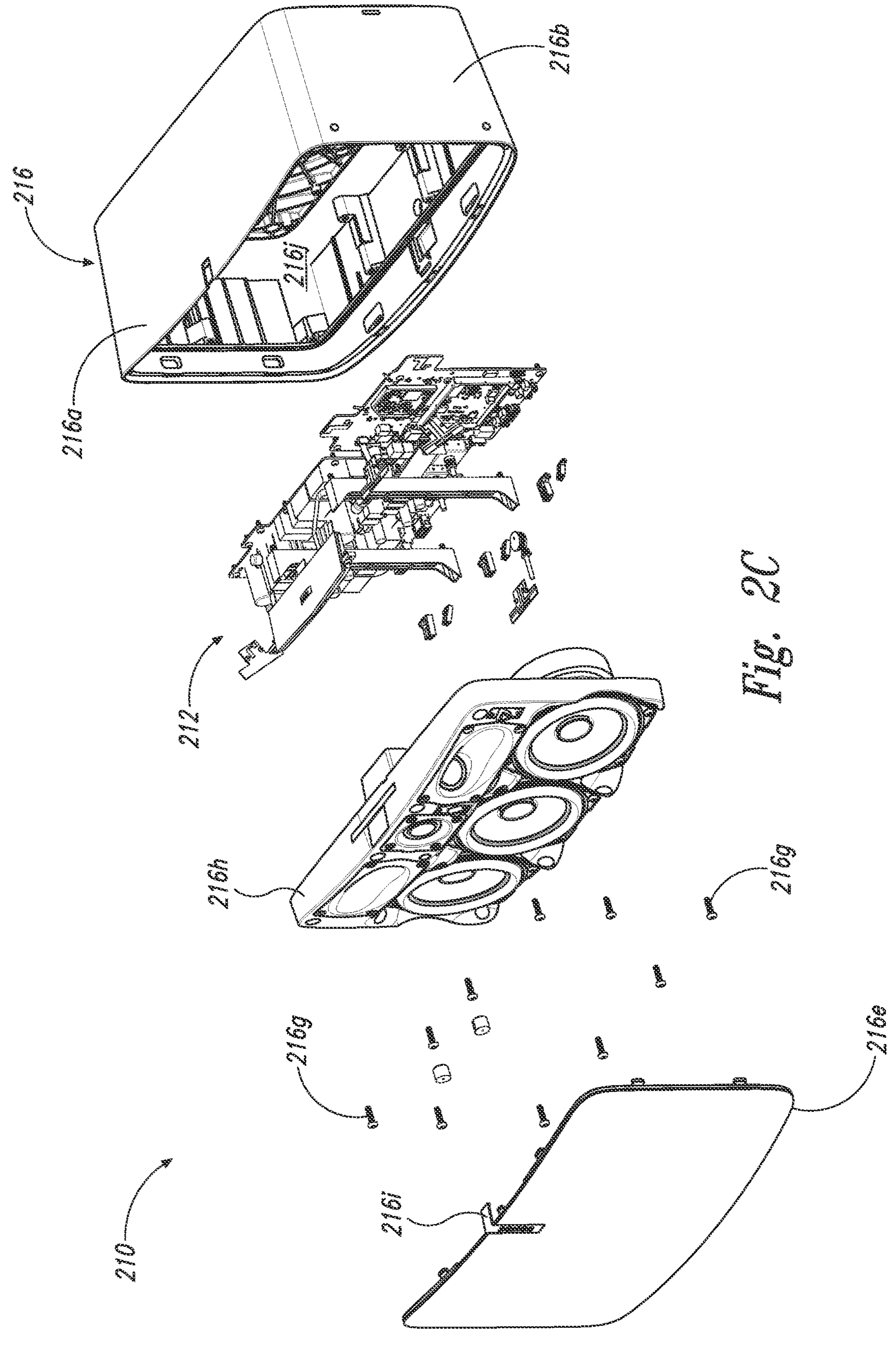
FIG. 2C is an exploded view of the playback device of FIG. 2A.

FIG. 2A is a front isometric view of a playback device 210 configured in accordance with embodiments of the disclosed technology. FIG. 2B is a front isometric view of the playback device 210 without a grille 216*e*. FIG. 2C is an exploded view of the playback device 210. Referring to FIGS. 2A-2C together, the playback device 210 comprises a housing 216 that includes an upper portion 216*a*, a right or first side portion 216*b*, a lower portion 216*c*, a left or second side portion 216*d*, the grille 216*e*, and a rear portion 216*f*. A plurality of fasteners 216*g* (e.g., one or more screws, rivets, clips) attaches a frame 216*h* to the housing 216. A cavity 216*j* (FIG. 2C) in the housing 216 is configured to receive the frame 216*h* and electronics 212. The frame 216*h* is configured to carry a plurality of transducers 214 (identified individually in FIG. 2B as transducers 214*a-f*). The electronics 212 (e.g., the electronics 112 of FIG. 1C) is configured to receive audio content from an audio source and send electrical signals corresponding to the audio content to the transducers 214 for playback.

The transducers 214 are configured to receive the electrical signals from the electronics 112, and further configured to convert the received electrical signals into audible sound during playback. For instance, the transducers 214*a-c* (e.g., tweeters) can be configured to output high frequency sound (e.g., sound waves having a frequency greater than about 2 kHz). The transducers 214*d-f* (e.g., mid-woofers, woofers, midrange speakers) can be configured output sound at frequencies lower than the transducers 214*a-c* (e.g., sound waves having a frequency lower than about 2 kHz). In some embodiments, the playback device 210 includes a number of transducers different than those illustrated in FIGS. 2A-2C. For example, the playback device 210 can include fewer than six transducers (e.g., one, two, three). In other embodiments, however, the playback device 210 includes more than six transducers (e.g., nine, ten). Moreover, in some embodiments, all or a portion of the transducers 214 are configured to operate as a phased array to desirably adjust (e.g., narrow or widen) a radiation pattern of the transducers 214, thereby altering a user's perception of the sound emitted from the playback device 210.

In the illustrated embodiment of FIGS. 2A-2C, a filter 216*i* is axially aligned with the transducer 214*b*. The filter 216*i* can be configured to desirably attenuate a predetermined range of frequencies that the transducer 214*b* outputs to improve sound quality and a perceived sound stage output collectively by the transducers 214. In some embodiments, however, the playback device 210 omits the filter 216*i*. In other embodiments, the playback device 210 includes one or more additional filters aligned with the transducers 214*b* and/or at least another of the transducers 214.

Figure 3A:
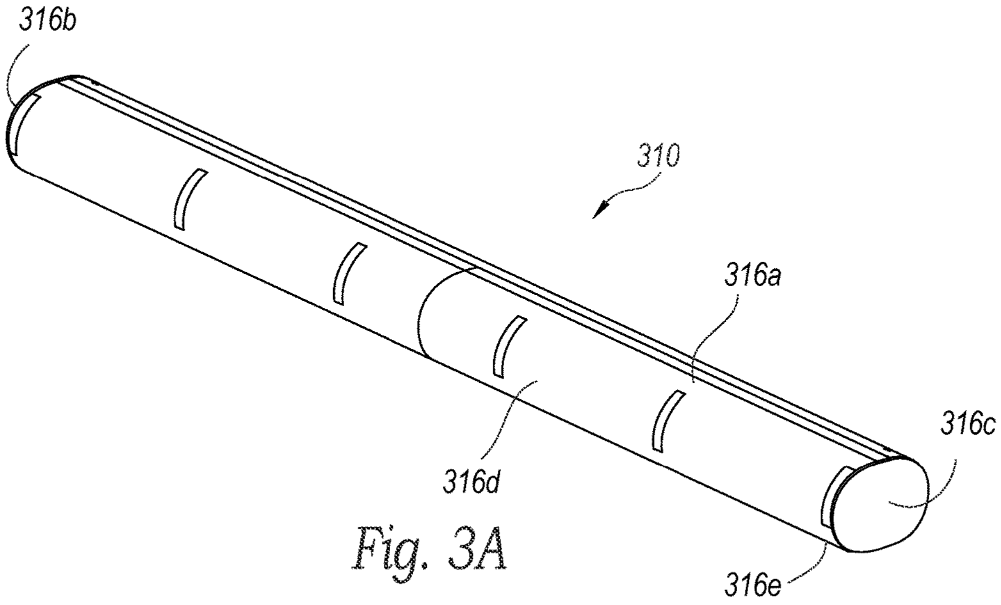
FIG. 3A is a perspective view of a playback device configured in accordance with embodiments of the disclosed technology.
Figure 3B:
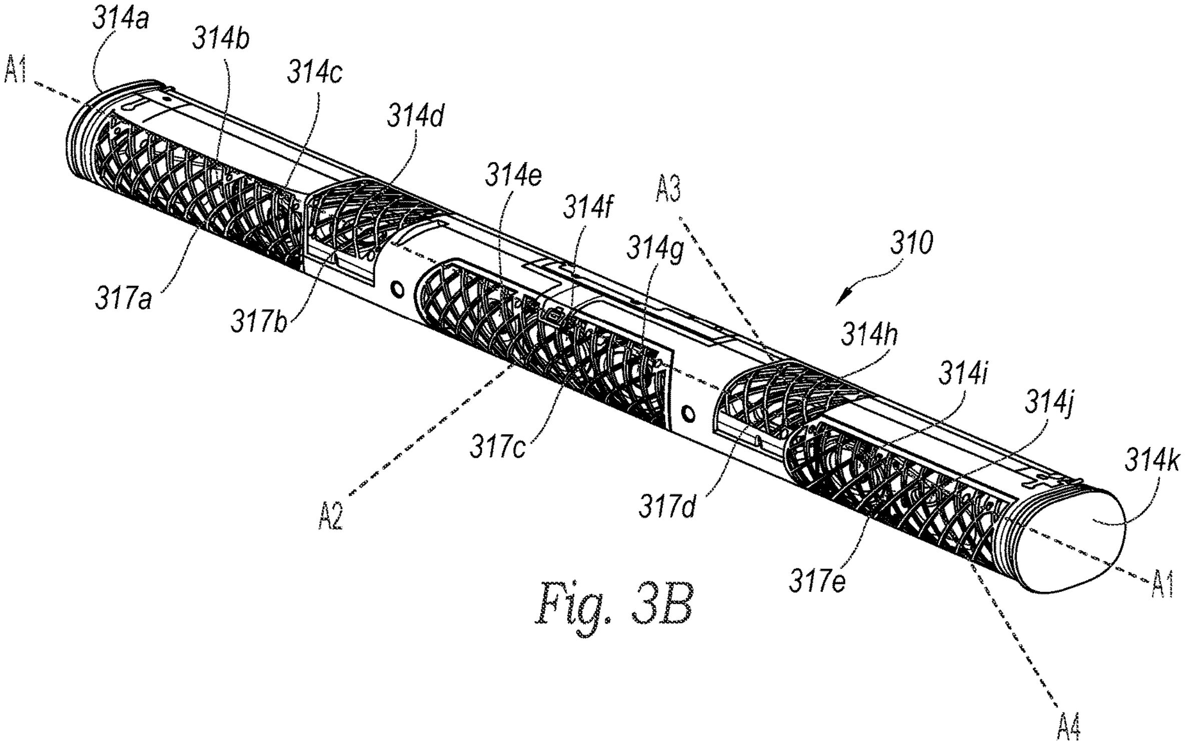
FIG. 3B illustrates the playback device of FIG. 3A with an outer cover removed.

FIG. 3A is a perspective view of a playback device 310, and FIG. 3B shows the device 310 with an outer covering removed to illustrate the plurality of transducers 314*a-k* disposed within a housing 316 (collectively "transducers 314"). The device 310 includes a body defined by housing 316, which is elongated along axis A1. The housing 316 includes an upper portion 316*a*, a first side or left portion 316*b*, an opposing second side or right portion 316*c*, and a forward portion 316*d*, and a lower portion 316*e*. In some embodiments, the housing 316 can define a curved surface, for example, with a curved transition between the upper portion 316*a* and the forward portion 316*d*, and/or with a curved transition between the forward portion 316*d* and the lower portion 316*e*. Such curved profiles can be particularly desirable from a design perspective, as the human eye tends to perceive objects with curved profiles as occupying a smaller volume. As such, a soundbar or other such playback device can appear smaller and more discreet by employing curved transitions along the outer surface. As described in more detail elsewhere herein, such curved profiles, while desirable from an industrial design perspective, may present unique challenges from an acoustic engineering perspective.

The housing 316 can define a plurality of openings to receive one or more transducers 314 therein, with each opening covered by a corresponding grille 317. For example, a first grille 317*a* covers an opening containing transducers 314*b* and 314*c*, a second grille 317*b* covers an opening containing the transducer 314*d*, and so forth. The transducers 314 disposed within the housing 316 can be similar or identical to any one of the transducers 214*a-f* described previously.

In this example, the playback device 310 takes the form of a soundbar that is elongated along a horizontal axis A1 and is configured to face along a primary sound axis A2 that is substantially orthogonal to the first horizontal axis A1. In other embodiments, the playback device 310 can assume other forms, for example having more or fewer transducers, having other form-factors, and/or having any other suitable modifications with respect to the embodiment shown in FIGS. 3A and 3B.

The playback device 310 can include individual transducers 314*a-k* oriented in different directions or otherwise configured to direct sound along different sound axes. For example, the transducers 314*c*, 314*e*, 314*f*, 314*g*, and 314*h* can be configured to direct sound primarily along directions parallel to the primary sound axis A2 of the playback device 310. Additionally, the playback device 310 can include left and right up-firing transducers (e.g., transducers 314*c* and 314*h*) that are configured to direct sound along axes that are angled vertically with respect to the primary sound axis A2. For example, the right up-firing transducer 314*h* is configured to direct sound along the axis A3, which is vertically angled with respect to the horizontal primary axis A2. In some embodiments, the up-firing sound axis A3 can be angled with respect to the primary sound axis A2 by between about 50 degrees and about 90 degrees, between about 60 degrees and about 80 degrees, or about 70 degrees.

The playback device 310 can also include one or more side-firing transducers (e.g., transducers 314*a*, 314*b*, 314*j*, and 314*k*), which can direct sound along axes that are horizontally angled with respect to the primary sound axis A2. In the illustrated embodiment, the outermost transducers 314*a* and 314*k* can be configured to direct sound primarily along the first horizontal axis A1 or partially horizontally angled therefrom, while the side-firing transducers 314*b* and 314*j* are configured to direct sound along axes that lie between the axes A1 and A2. For example, the right side-firing transducer 314*j* is configured to direct sound along axis A4. In some embodiments, the side-firing sound axis A4 can be angled with respect to the primary sound axis A2 by between about 40 and about 80 degrees, between about 50 degrees and about 70 degrees, or about 60 degrees.

In operation, the playback device 310 can be utilized to play back 3D audio content that includes a vertical component. As noted previously, certain 3D audio or other immersive audio formats include one or more vertical channels in addition to any lateral (e.g., left, right, front) channels. Examples of such 3D audio formats include DOLBY ATMOS, MPEG-H, and DTS:X formats.

Figure 3C:
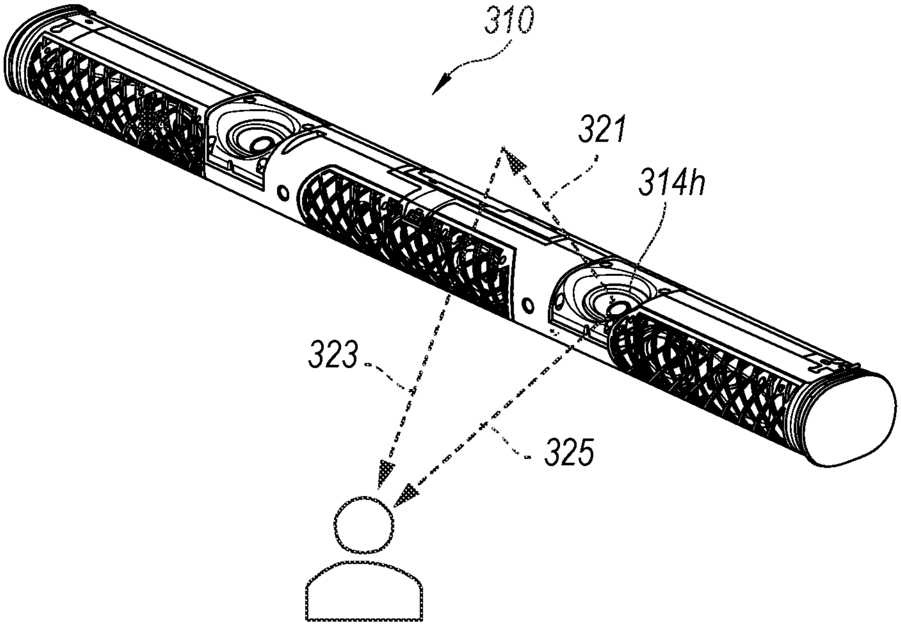
FIG. 3C illustrates the playback device of FIG. 3B with speaker grilles removed.

FIG. 3C schematically illustrates playback of vertical audio content via the playback device 310. For ease of illustration, the speaker grilles 317*b* and 317*d* overlying the up-firing transducers 314*d* and 314*h* are omitted. As illustrated, the right up-firing transducer 314*h* can direct sound output 321 along the vertically oriented axis (e.g., an axis that is vertically angled with respect to a primary sound axis or forward axis of the playback device 310). This output 321 can reflect off an acoustically reflective surface (e.g., a ceiling), after which the reflected output 323 reaches the listener at a target location. Because the listener perceives the audio output 323 as originating from point of reflection on the ceiling, the psychoacoustic perception is that the sound is above the listener. However, this effect may be reduced due to horizontal "leakage," in which at least a portion of the audio output of the transducer 314*h* propagates directly towards the listener without first reflecting off the ceiling (e.g., as output 325 in FIG. 3C). This leakage can be particularly pronounced in lower frequencies, which tend to exhibit less directionality than higher frequencies. Since at least some of the output may leak along the horizontal direction as output 325, the listener's perception of audio output from the up-firing transducer 314*h* is a combination of the ceiling-reflected output 323 and the horizontally leaked output 325. Moreover, the leaked output 325 will reach the listener first, since its path length is shorter than that of the reflected output (output 321 and 323 together). As a result, the listener may localize the source of the audio output as being the up-firing transducer 314*h* rather than the reflection point on the ceiling, thereby undermining the immersiveness of the 3D audio.

In some embodiments these undesirable effects can be ameliorated by providing an acoustic waveguide coupled to the up-firing transducer (e.g., transducer 314*h*) that is configured to inhibit or reduce horizontal leakage while accommodating the required form factor of the playback device 310. For example, in some embodiments the transducer 314*h* and waveguide are together configured such that the reflected output 323 has a greater sound pressure level (SPL) than the horizontally leaked output 325. For example, in various embodiments, during playback of audio at approximately 2000 Hz, the reflected output 323 can have an SPL that is at least 5 dB, 6 dB, 7 dB, 8 dB, 9 dB, 10 dB, 11 dB 12 dB, 13 dB, 14 dB, 15 dB, 20 dB, 30 dB, 40 dB, or 50 dB greater than the leaked output 325 (e.g., the portion of the vertical content that reaches the listener via horizontal propagation from the up-firing transducer 314*h*). This reduction in horizontal leakage can be achieved by providing a waveguide having a geometry that blocks and/or redirects at least some of the horizontally directed output such that the total output is more directional and oriented along the vertical sound axis (e.g., sound axis A3 shown in FIG. 3B).

A conventional approach to using an acoustic waveguide to block horizontal leakage might include providing a waveguide with a very tall forward wall. However, such a tall forward wall may be incompatible with a soundbar or other playback device having a compact cross-sectional area and particularly having a curved forward surface. To accommodate a very tall forward wall of a waveguide, such a playback device would need to either be substantially enlarged, or else would need to assume a more boxy, rectangular cross-section. As noted previously, a compact design with a curved transition between an upper portion 316*a* and a forward portion 316*d* is highly desirable from an industrial design and user-experience perspective. As described in more detail below, some embodiments of the present technology include a waveguide that both accommodates the contoured outer surface of the playback device 310 while also achieving the desired directionality for an up-firing transducer (e.g., by reducing horizontal leakage).

Figure 3D:
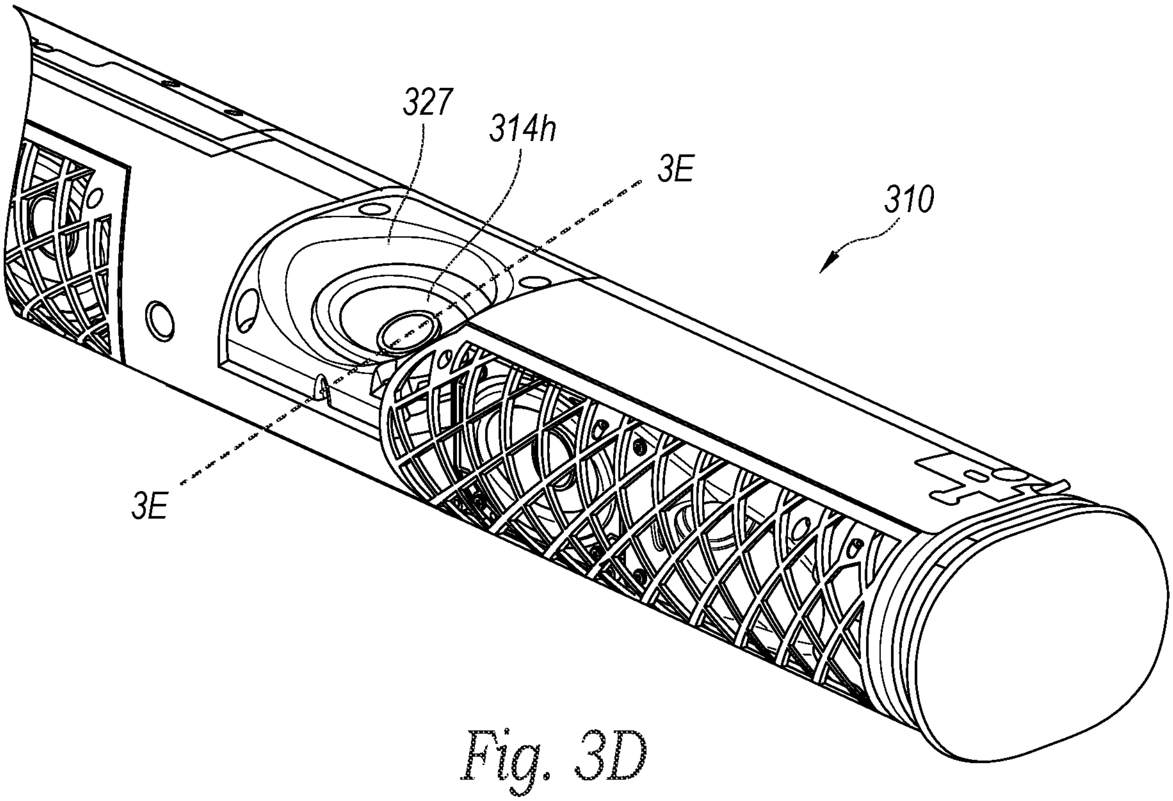
FIG. 3D is an enlarged detail view of a portion of the playback device of FIG. 3C including an up-firing transducer and an acoustic waveguide.
Figure 3E:
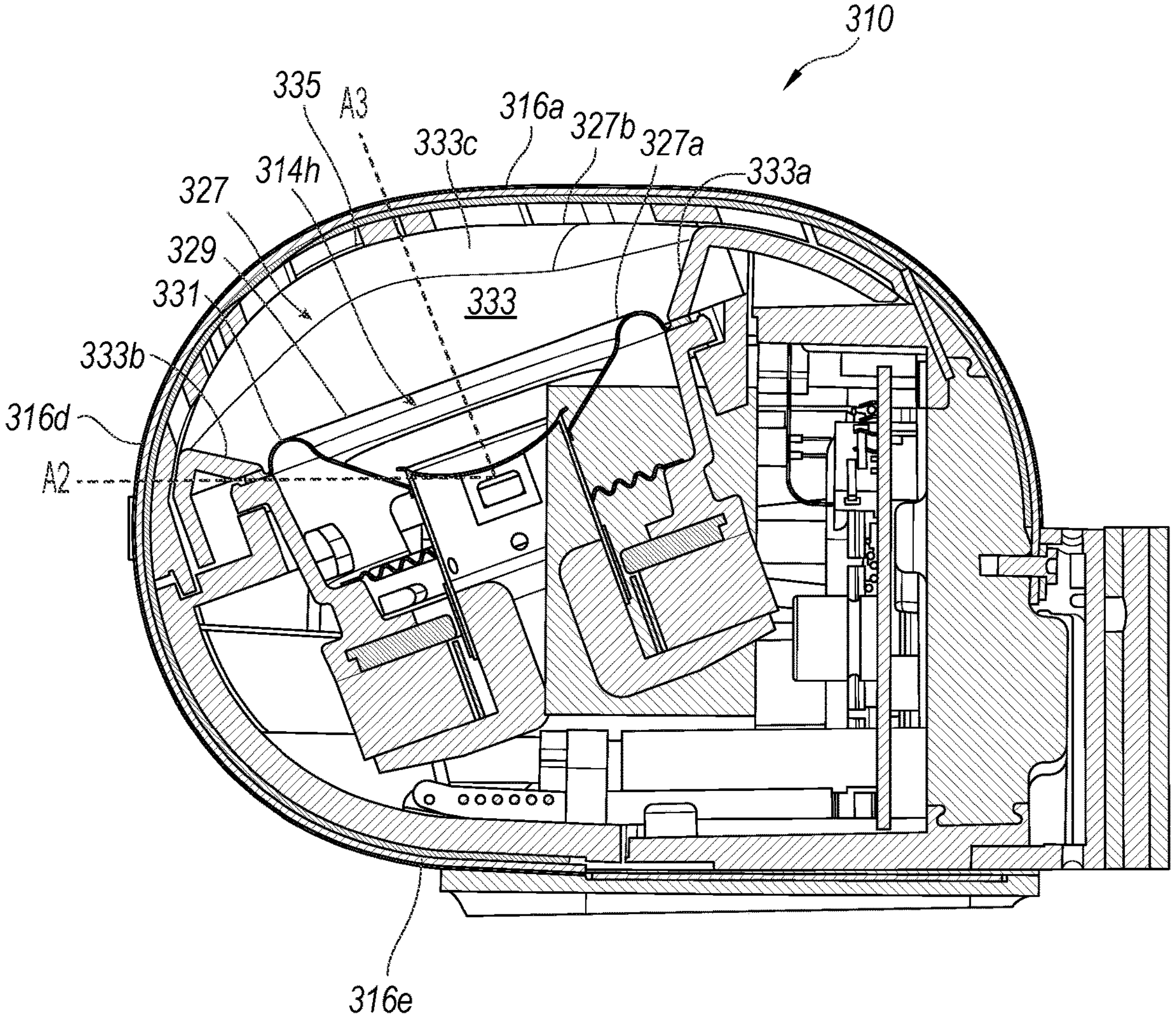
FIG. 3E is a side cross-sectional view of the up-firing transducer and acoustic waveguide shown in FIG. 3D.
Figure 4A:
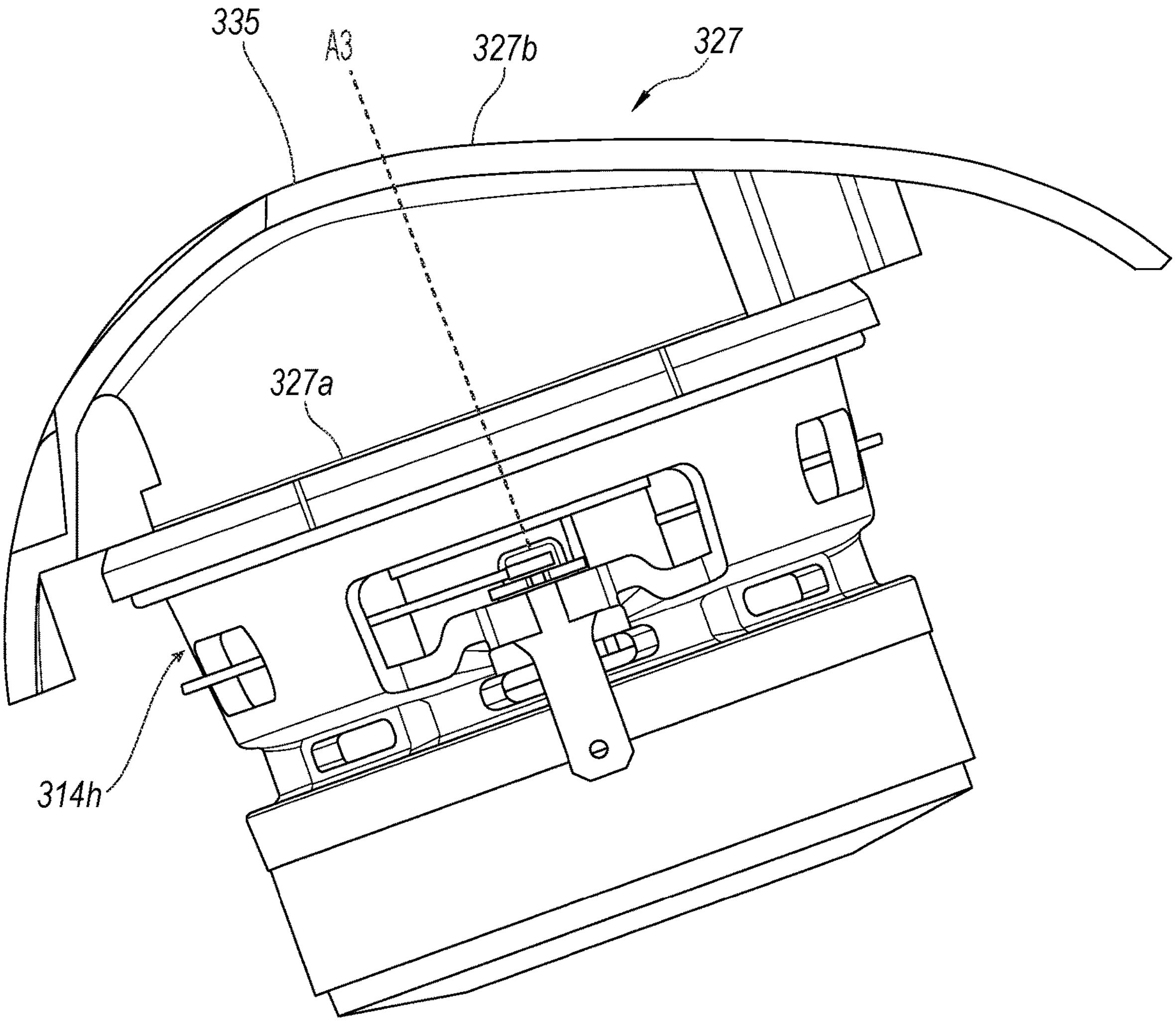
FIG. 4A is a side view of a transducer and acoustic waveguide in accordance with embodiments of the present technology.
Figure 4B:
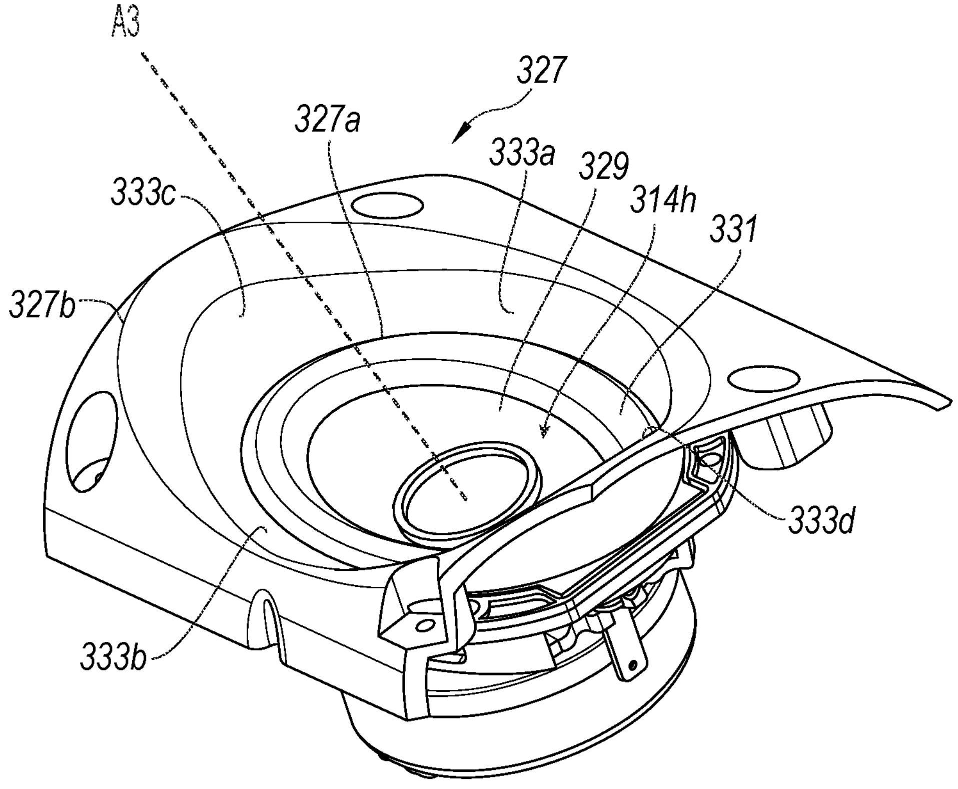
FIG. 4B is a top perspective view of the transducer and acoustic waveguide shown in FIG. 4A.
Figure 4C:
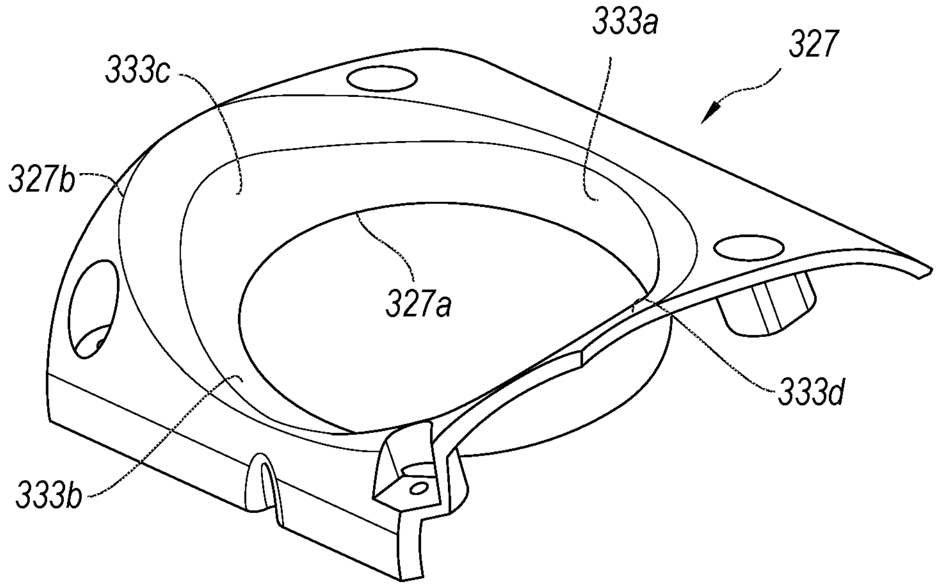
FIG. 4C is a top perspective view of the acoustic waveguide shown in FIG. 4B.

FIG. 3D illustrates an enlarged detail view of a portion of the playback device 310 including the up-firing transducer 314*h* and an accompanying waveguide 327. FIG. 3E illustrates a cross-sectional view taken along line 3E-3E shown in FIG. 3D. FIGS. 4A and 4B illustrate side and top perspective views, respectively, of the up-firing transducer 314*h* coupled to the waveguide 327. FIG. 4C is a top perspective view of the waveguide 327 separated from the transducer. Referring to FIGS. 3D-4C together, the waveguide 327 is in fluid communication with the transducer 314*h* such that audio output from the transducer 314*h* passes through an aperture defined by the waveguide 327. The transducer 314*h* includes a diaphragm 329 coupled to a surrounding support 331. In operation, oscillatory movement of the diaphragm 329 directs audio output along a sound axis (e.g., axis A3), which is vertically angled with respect to a horizontal axis (e.g., axis A2). As noted previously, the up-firing sound axis A3 can be angled with respect to the primary sound axis A2 by between about 50 degrees and about 90 degrees, between about 60 degrees and about 80 degrees, or about 70 degrees.

The waveguide 327 can take the form of a horn-like element having a first or lower end 327*a* that is disposed adjacent the transducer 314*h*, for example partially or fully circumferentially surrounding the diaphragm 329 and/or the support 331. An opposing second or upper end 327*b* of the waveguide 327 can be disposed adjacent the perimeter of the playback device 310, for example adjacent the upper portion 316*a* and the forward portion 316*d* of the housing 316. As shown, the upper end 327*b* of the waveguide can have a contour that substantially corresponds to the outer perimeter of the playback device 310, for example having a convex shape that curves between an area adjacent the upper portion 316*a* of the housing and an area adjacent the forward portion 316*d* of the housing. In some embodiments, the lower end 327*a* defines a lower opening surrounding the diaphragm 329 and the opposing upper end 327*b* defines an upper opening through which the audio output is directed. In some embodiments, the upper opening defined by the upper end 327*b* can be larger than the opening defined by the lower end 327*a* of the waveguide 327.

The waveguide 327 can be characterized by a sidewall 333 that extends between the lower end 327*a* and the upper end 327*b*. In some embodiments, the sidewall 333 extends partially or completely circumferentially around the transducer 314*h*. The sidewall 333 can have a height (e.g., a distance from the transducer 314*h* measured along an axis parallel to the vertical sound axis A3) that varies around the perimeter of the waveguide 327. For example, the height of the sidewall can vary with an azimuthal angle around the sound axis A3. As seen in FIG. 3E, the height of the sidewall 333 is lowest in rearward and forward portions 333*a* and 333*b*, and is greatest in a left portion 333*c* and a corresponding right portion 333*d* (not shown in FIG. 3E). In the illustrated embodiment, an apex 335 of the sidewall 333 (e.g., the point of greatest height from the transducer 314*h*) is at a position displaced forwardly with respect to the vertical sound axis A3. The contour of the upper end 327*b* of the waveguide 327 (as defined by the varying height of the sidewall 333) can taper from the apex 335 in both the forward and rearward directions. In some embodiments, the height of the sidewall 333 tapers more steeply from the apex 335 in the forward direction than in the rearward direction.

Additionally or alternatively, the sidewall 333 can have a slope (e.g., an angle of divergence with respect to the sound axis A3) that varies among different portions of the waveguide 327. For example, the slope of the sidewall 333 can vary with an azimuthal angle of the sound axis A3. In the illustrated embodiment, the sidewall 333 has a steeper slope in a rear portion 333*a* than in a forward portion 333*b*. In other words, the angle between the rear portion 333*a* and the sound axis A3 is smaller than the angle between the forward portion 333*b* and the sound axis A3. As best seen in FIGS. 4B and 4C, the sidewall 333 can also have a flatter slope in left and right portions 333*c* and 333*c* than in both the rear and forward portions 333*a* and 333*b*. In some embodiments, this flatter slope in the left and right portions 333*c* and 333*d* can provide a wider opening along a left-right axis at the upper end 327*b* of the waveguide 327, as compared to the opening along a forward-rearward axis at the upper end 327*b* of the waveguide 327. This wider lateral opening can facilitate lateral dispersion, which may beneficially provide a wider soundstage and improved listening experience.

Because both the height and the slope of the sidewall 333 can vary with an azimuthal angle around the sound axis A3, the radial distance between any portion of the sidewall 333 and the axis A3 can likewise vary with an azimuthal angle around the sound axis A3. For example, the radial distance between the sound axis A3 and the rear portion 333*a* of the sidewall can be less than the radial distance between the sound axis A3 and the forward portion 333*b* of the sidewall. Similarly, the radial distance between the sound axis A3 and both the left and right portions of the sidewall 333*c* and 333*d* can be greater than the radial distance between the sound axis A3 and the forward portion 333*b* of the sidewall. By selecting appropriate slope, height, and radial distances for various portions of the sidewall 333, the waveguide 327 can achieve a contour that can be accommodated within a playback device 310 such as a soundbar having a curved forward surface while also providing the required directionality for an up-firing transducer 314*h*.

Although several embodiments disclosed herein relate to acoustic waveguides used in conjunction with up-firing transducers, in various embodiments such waveguides can be used with other transducers, for example forward-firing or side-firing transducers. In certain instances, the design and configuration of acoustic waveguides may be varied to achieve the desired output for a particular transducer and to accommodate the particular geometry of the playback device at that transducer location.

Figure 5A:
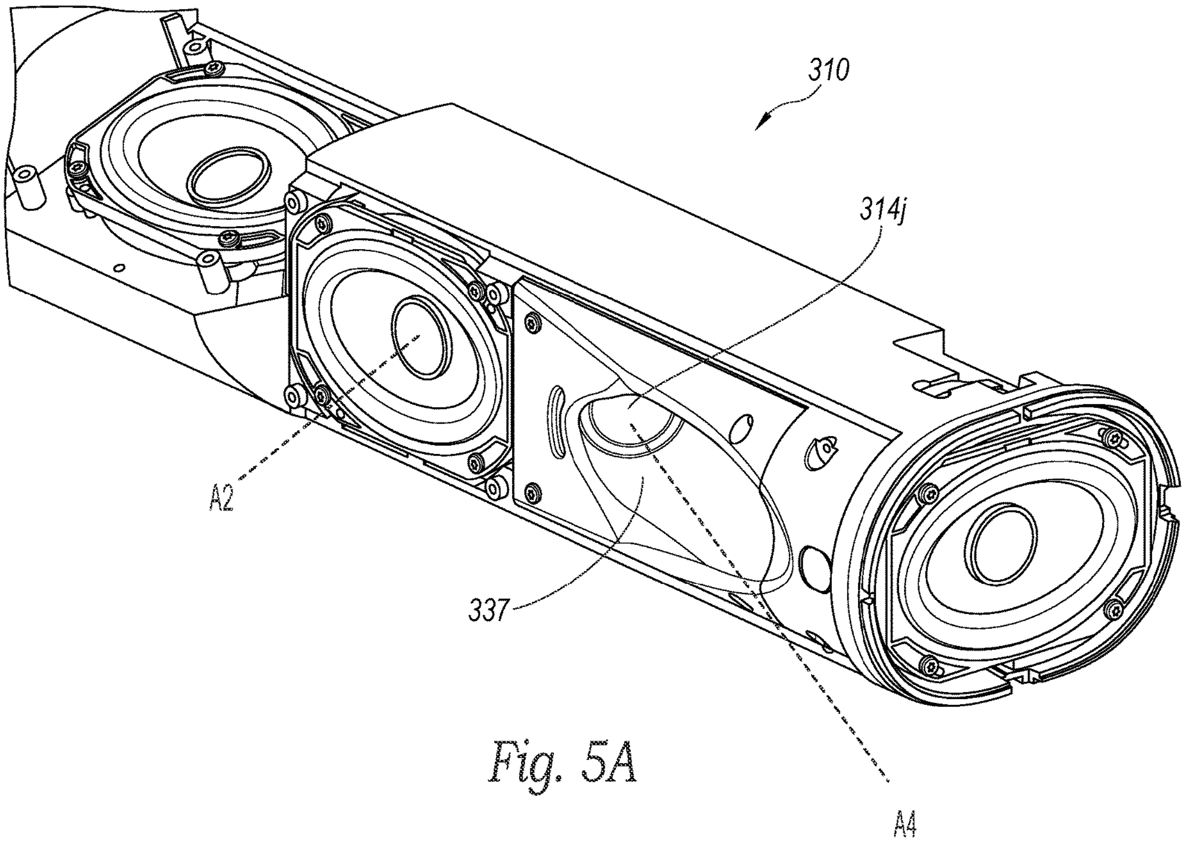
FIG. 5A is a perspective view of a portion of a playback device including a side-firing transducer and an acoustic waveguide in accordance with embodiments of the present technology.

FIG. 5A is an enlarged perspective view of a portion of the playback device 310 including the side-firing transducer 314*j* in fluid communication with a waveguide 337. As noted previously, the side-firing transducer 314*j* can be configured to direct audio output along a sound axis (e.g., axis A4) that is horizontally angled with respect to a forward axis (e.g., axis A2) of the playback device 310. The side-firing sound axis A4 can be angled with respect to the primary sound axis A2 by between about 40 degrees and about 80 degrees, between about 50 degrees and about 70 degrees, or about 60 degrees.

In operation, audio output from the side-firing transducer 314*j* can be directed along axis A4 towards a laterally positioned acoustically reflective surface (e.g., a wall), such that the output from the transducer 314*j* reflects off the surface and is redirected towards a listener. This redirected audio can provide enhanced immersiveness and a wider soundstage. The resulting psychoacoustic effect is that the listener perceives the sound as originating from a location to the side of the listener. Similar to the description above with respect to the up-firing transducer, horizontal leakage from the side-firing transducer 314*j* (e.g., audio output that propagates directly towards a listener along an axis parallel to the forward axis A2) can undermine the desired immersiveness, such that a listener localizes the source of the output as the transducer 314*j*, rather than the reflection point of the wall or other acoustically reflective surface.

To ameliorate this and other problems, and to achieve the desired directivity of the audio output, the acoustic waveguide 337 can be configured to inhibit or reduce horizontal leakage of audio output from the side-firing transducer 314*j*, thereby enhancing directivity along the side-firing axis (e.g., axis A4). For example, in various embodiments, during playback of audio at approximately 2000 Hz, the reflected output (e.g., output directed along axis A4 and reflected towards a listener) can have an SPL that is at least 5 dB, 6 dB, 7 dB, 8 dB, 9 dB, 10 dB, 11 dB 12 dB, 13 dB, 14 dB, 15 dB, 20 dB, 30 dB, 40 dB, or 50 dB greater than horizontally leaked output (e.g., the portion of the audio output that reaches the listener via direct horizontal propagation along a direction parallel to axis A2 from the side-firing transducer 314*j*).

Figure 5B:
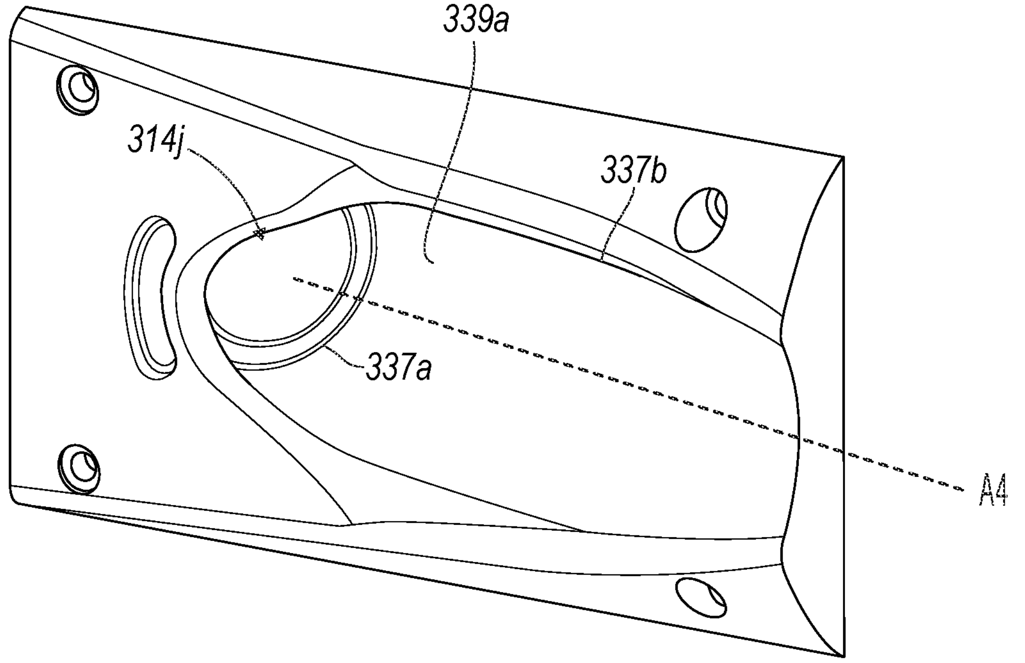
FIG. 5B is an enlarged perspective view of the side-firing transducer and acoustic waveguide shown in FIG. 5A.
Figure 5C:
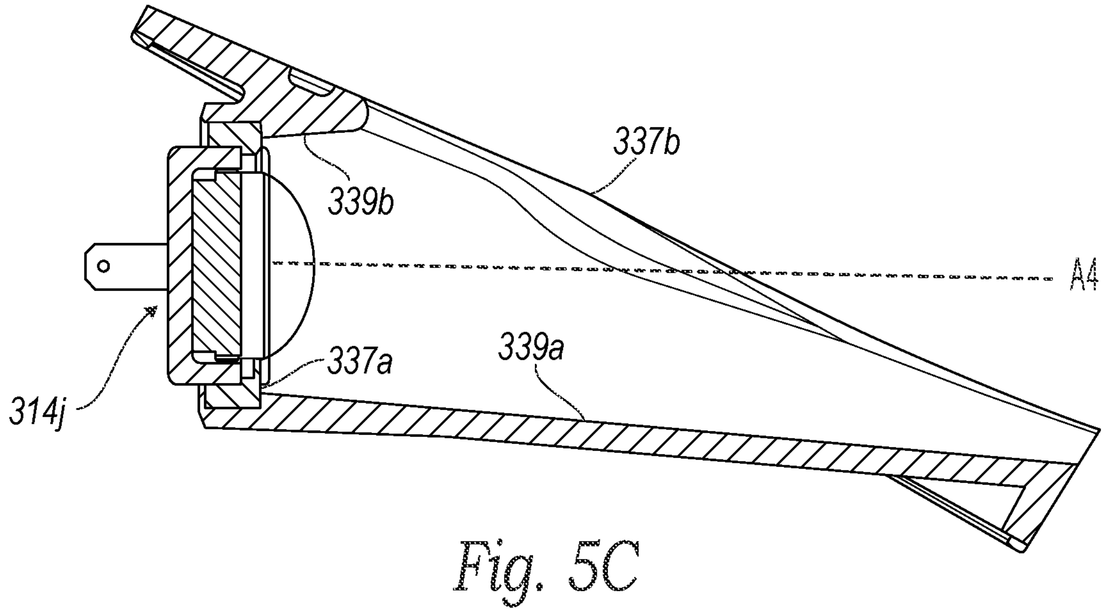
FIG. 5C is a top cross-sectional view of the side-firing transducer and acoustic waveguide shown in FIG. 5B.

FIG. 5B is an isolated perspective view of the side-firing transducer 314*j* and the acoustic waveguide shown in FIG. 5A, and FIG. 5C is a top cross-sectional view of the side-firing transducer and the acoustic waveguide shown in FIG. 5B. With reference to FIGS. 5B and 5C together, the waveguide 337 can take the form of a horn-like element having a first or inner end 337*a* and a second or outer end 337*b* opposite the inner end 337*a*. The inner end 337*a* can be disposed adjacent to the transducer 314*j*, for example partially or completely circumferentially surrounding a diaphragm of the transducer 314*j*. The outer end 337*b* can define a contour that substantially corresponds to an outer perimeter of the playback device 310, for example corresponding to the upper and forward portions 316*a* and 316*d* of the housing 316.

The waveguide 337 can be characterized by a sidewall 339 that extends between the inner end 337*a* and the outer end 337*b*. In some embodiments, the sidewall 339 extends partially or completely circumferentially around the transducer 314*j*. The sidewall 339 can have a length (e.g., a distance from the transducer 314*j* measured along an axis parallel to the side-firing sound axis A4) that varies around the perimeter of the waveguide 337. For example, the length of the sidewall can vary with an azimuthal angle around the sound axis A4. As seen in FIG. 5C, the length of the sidewall 339 is substantially greater in a rear portion 339*a* than in an opposing forward portion 339*b*. In some embodiments, the rear portion of the sidewall 339*a* can have a length that is at least two times, at least three times, at least four times, or at least five times greater than a length of the forward portion 339*b* of the sidewall.

In some embodiments, the length of the sidewall 339 along the forward portion 339*b* can be selected so as to inhibit or reduce horizontal leakage of audio output from the side-firing transducer 314*j* (i.e., by providing a sufficiently deep "throat" to the waveguide 337). For example, in some embodiments, the sidewall 339 can have a length along the forward portion 339*b* of at least about 5 mm, about 6 mm, about 7 mm, about 8 mm, about 9 mm, about 10 mm, about 11 mm, about 12 mm, about 13 mm, about 14 mm, about 15 mm, about 16 mm, about 17 mm, about 18 mm, about 19 mm, about 20 mm, or longer.

As noted previously, due to the desire for a compact size of playback devices, space within certain playback devices may be constrained or limited in a variety of ways. As such, in some embodiments, it can be beneficial to deviate from conventional approaches to transducer arrangement in order to accommodate a smaller form factor. This may be particularly true when playback devices incorporate significant electronic components, for example wireless communication circuitry and processing components in addition to amplifiers and other electronics required to drive the transducers.

Figure 6:
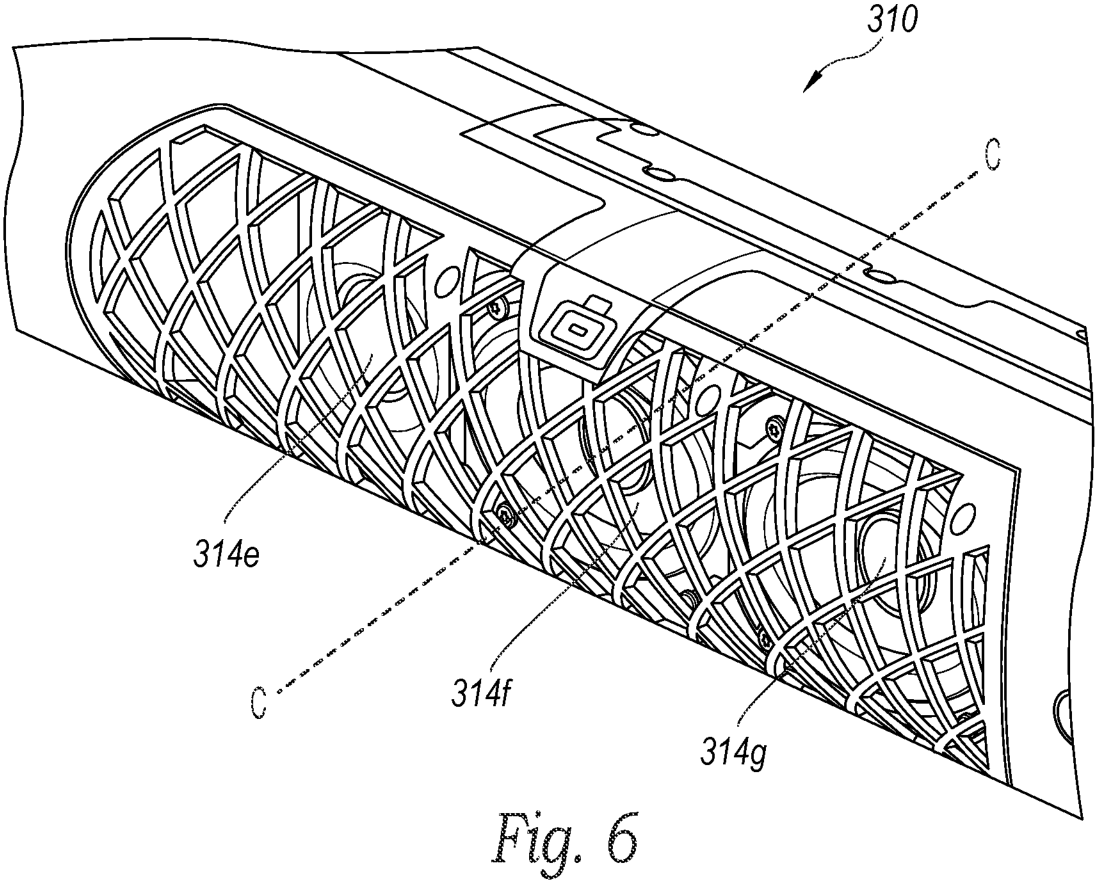
FIG. 6 is an enlarged perspective view of a central portion of a playback device in accordance with embodiments of the present technology.

FIG. 6 illustrates a central portion of a playback device 310, in which a center line of the device is shown as line C-C (e.g., the line C-C is equidistant from opposing lateral ends of the playback device 310). This portion of the playback device 310 includes three forward-firing transducers: a center tweeter 314*e* and two center woofers 314*f* and 314*g*. Conventionally, three such transducers would be arranged with a center tweeter positioned directly in the center of the playback device 310, with the two woofers disposed on opposite sides of the center tweeter. However, in the illustrated embodiment, the center tweeter 314*e* is laterally offset from the center line C-C, and the two woofers 314*f* and 314*g* are disposed directly adjacent to one another. In this arrangement, a center-to-center distance between the two woofers 314*f* and 314*g* can be less than about 200 mm, about 150 mm, about 100 mm, about 80 mm, about 60 mm, or less.

This unconventional arrangement of transducers in a central portion of the playback device 310 provides several benefits. First, because the woofers 314*f* and 314*g* extend further back into the body of the playback device 310 than the tweeter 314*e*, grouping the woofers 314*f* and 314*g* together allows the space behind the tweeter 314*e* to be utilized more effectively. Rather than having such space behind the tweeter 314*e* be cabined between the two woofers 314*f* and 314*g*, the space behind the tweeter 314*e* can extend to adjacent space within the central portion of the playback device 310. This space can be usefully employed to house electronic components or other elements within the playback device 310. This asymmetrical transducer arrangement can also provide acoustic benefits. For example, by placing the woofers 314*f* and 314*g* directly adjacent one another, the beam-steering capacity using these transducers is increased. In general, the upper frequency limit of beam-steering is limited by the distance between the two closest acoustic points. With a center-to-center distance between the two woofers 314*f* and 314*g* that is relatively small (e.g., less than 100 mm, or about 60 mm), directivity can be controlled using beam-forming techniques for frequencies up to approximately 1500 Hz. Under conventional arrangements, with a tweeter disposed between the two woofers, the center-to-center distance would be dramatically increased, and beam-forming efficacy would correspondingly be reduced.

IV. Conclusion

The above discussions relating to playback devices, controller devices, playback zone configurations, and media content sources provide only some examples of operating environments within which functions and methods described below may be implemented. Other operating environments and/or configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software embodiments or components can be embodied exclusively in hardware, exclusively in software, exclusively in firmware, or in any combination of hardware, software, and/or firmware. Accordingly, the examples provided are not the only ways) to implement such systems, methods, apparatus, and/or articles of manufacture.

Additionally, references herein to “embodiment” means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring embodiments of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The disclosed technology is illustrated, for example, according to various embodiments described below. Various examples of embodiments of the disclosed technology are described as numbered examples (1, 2, 3, etc.) for convenience. These are provided as examples and do not limit the disclosed technology. It is noted that any of the dependent examples may be combined in any combination, and placed into a respective independent example. The other examples can be presented in a similar manner.

Example 1. A playback device comprising: an elongated body defining an outer perimeter that includes a forward surface, an upper surface, and a rounded edge between the forward surface and the upper surface; at least one forward-firing transducer configured to direct sound along a first axis substantially orthogonal to the forward surface; an up-firing transducer configured to direct sound along a second axis that has a vertical oblique angle with respect to the first axis; a waveguide in fluid communication with the up-firing transducer, the waveguide comprising: a sidewall extending circumferentially around the diaphragm, the sidewall having a first end adjacent the up-firing transducer and a second end adjacent the outer perimeter; and an opening defined by the sidewall, the opening having a larger area at the second end than at the first end; wherein a rear portion of the sidewall is more steeply angled with respect to the second axis than a forward portion of the sidewall.

Example 2. The playback device of Example 1, wherein a left portion of the sidewall and a right portion of the sidewall are each less steeply angled with respect to the second axis than the rear portion of the sidewall.

Example 3. The playback device of any of the preceding Examples, wherein the second end of the sidewall has a contour substantially corresponding to the outer perimeter.

Example 4. The playback device of any of the preceding Examples, wherein the sidewall extends around an axis passing through the up-firing transducer, and wherein a height of the second end of the sidewall varies with an azimuthal angle about the axis such that the height at the rear and forward portions of the sidewall is less than the height at left and right portions of the sidewall.

Example 5. The playback device of any of the preceding Examples, wherein the up-firing transducer and waveguide are each configured such that, during playback of audio at 2000 Hz, a ratio of acoustic energy along the first axis to acoustic energy directed along the second axis is −10 dB or less.

Example 6. The playback device of any of the preceding Examples, wherein an angle between the second axis is vertically angled with respect to the first axis by between about 60 to 80 degrees.

Example 7. The playback device of any of the preceding Examples, wherein the up-firing transducer comprises a diaphragm supported by a suspension, the diaphragm configured to be displaced in a direction substantially aligned with the second axis, and wherein the first end of the sidewall is disposed adjacent to the suspension.

Example 8. The playback device of claim 1, wherein the opening has a dimension aligned with the second axis at the second edge that varies with an azimuthal angle about the second axis.

Example 9. A playback device comprising: an electroacoustic transducer; and an acoustic waveguide in fluid communication with the transducer, the waveguide comprising: a sidewall extending around an axis passing through the transducer, the sidewall having a height from the transducer that varies with an azimuthal angle about the axis such that the height at rear and forward portions of the sidewall is less than the height at left and right portions of the sidewall; and an opening defined by the sidewall, the opening having a radial dimension from the axis that varies with the azimuthal angle about the axis such that the radial dimension at the rear portion of the sidewall is less than the radial dimension at the forward portion of the sidewall.

Example 10. The playback device of any of the preceding Examples, wherein the height of the sidewall defines a convex outer surface.

Example 11. The playback device of any of the preceding Examples, wherein the convex outer surface has a greatest height at a position offset from the axis in a forward direction.

Example 12. The playback device of any of the preceding Examples, wherein a height of the sidewall tapers from an apex in a forward direction towards the front portion and tapers in a rearward direction towards the rear portion, and wherein the forward taper is steeper than the rearward taper.

Example 13. The playback device of any of the preceding Examples, wherein the radial dimensions at the left and right portions of the sidewall are each greater than the radial dimensions at the rear and forward portions of the sidewall.

Example 14. The playback device of any of the preceding Examples, wherein the rear portion of the sidewall extends substantially parallel to the axis.

Example 15. The playback device of any of the preceding Examples, wherein the transducer comprises a diaphragm supported by a suspension, the diaphragm configured to be displaced in a direction substantially aligned with the axis, and wherein the first edge of the sidewall is disposed adjacent to the suspension.

Example 16. The playback device of any of the preceding Examples, wherein: the axis is a primary sound axis; a forward axis is horizontally angled with respect to the primary sound axis by between about 60 to 80 degrees; and the transducer and waveguide are configured such that, during playback of audio at 2000 Hz, a ratio of acoustic energy along the forward axis to acoustic energy directed along the primary sound axis is −10 dB or less.

Example 17. A playback device comprising an enclosure elongated along an axis between a first end and a second end; a plurality of electroacoustic transducers disposed within the enclosure and including a center array configured to play back a center channel of audio content, the center array comprising: a first woofer disposed substantially centrally between the first end and the second end of the enclosure; a second woofer disposed laterally adjacent a first side of the first woofer; and a tweeter disposed laterally adjacent a second side of the first woofer opposite the first side wherein the tweeter is laterally offset from a centerline between the first end and the second end so as to be nearer to the first end than the second end.

Example 18. The playback device of any of the preceding Examples, wherein a center-to-center distance between the first woofer and the second woofer is less than about 100 mm.

Example 19. The playback device of any of the preceding Examples, wherein the plurality of electroacoustic transducers further comprises a side-firing transducer configured to output audio along a sound axis that is laterally angled with respect to a forward surface of the enclosure, the playback device further comprising a waveguide in fluid communication with the side-firing transducer, the waveguide having a rear sidewall and a forward sidewall, the rear sidewall having a length at least 3 times greater than the forward sidewall.

Example 20. The playback device of any of the preceding Examples, wherein the forward sidewall has a length of at least about 10 mm.

The invention claimed is:

1. A playback device comprising:

an elongated body defining an outer perimeter that includes a forward surface, an upper surface, and a rounded edge between the forward surface and the upper surface;

at least one forward-firing transducer configured to direct sound along a first axis substantially orthogonal to the forward surface;

an up-firing transducer configured to direct sound along a second axis that has a vertical oblique angle with respect to the first axis; and a waveguide in fluid communication with the up-firing transducer, the waveguide comprising:

a sidewall extending circumferentially around the up-firing transducer, the sidewall having a first end adjacent the up-firing transducer and a second end adjacent the outer perimeter; and an opening defined by the sidewall, the opening having a larger area at the second end than at the first end;

wherein a rear portion of the sidewall is more steeply angled with respect to the second axis than a forward portion of the sidewall, and wherein the up-firing transducer and the waveguide are each configured such that, during playback of audio at 2000 Hz via the up-firing transducer, a ratio of acoustic energy along the first axis to acoustic energy along the second axis is −10 dB or less.

2. The playback device of claim 1, wherein a left portion of the sidewall and a right portion of the sidewall are each less steeply angled with respect to the second axis than the rear portion of the sidewall.

3. The playback device of claim 1, wherein the second end of the sidewall has a contour substantially corresponding to the outer perimeter.

4. The playback device of claim 1, wherein the sidewall extends around the second axis, and wherein a height of the second end of the sidewall varies with an azimuthal angle about the second axis such that the height at the rear and forward portions of the sidewall is less than the height at left and right portions of the sidewall.

5. The playback device of claim 1, wherein an angle between the second axis and the first axis between about 60 to 80 degrees.

6. The playback device of claim 1, wherein the up-firing transducer comprises a diaphragm supported by a suspension, the diaphragm configured to be displaced in a direction substantially aligned with the second axis, and wherein the first end of the sidewall is disposed adjacent to the suspension.

7. The playback device of claim 1, wherein the opening has a dimension aligned with the second axis at the second end that varies with an azimuthal angle about the second axis.

8. A playback device comprising:

an electroacoustic transducer;

an acoustic waveguide in fluid communication with the transducer, the waveguide comprising:

a sidewall extending around a primary sound axis passing through the transducer, the sidewall having a height from the transducer that varies with an azimuthal angle about the primary sound axis such that the height at rear and forward portions of the sidewall is less than the height at left and right portions of the sidewall; and an opening defined by the sidewall, the opening having a radial dimension from the primary sound axis that varies with the azimuthal angle about the primary sound axis such that the radial dimension at the rear portion of the sidewall is less than the radial dimension at the forward portion of the sidewall; and a forward axis of the playback device that is horizontally angled with respect to the primary sound axis by between about 60 to 80 degrees, wherein the transducer and the waveguide are configured such that, during playback of audio at 2000 Hz via the transducer, a ratio of acoustic energy along the forward axis to acoustic energy directed along the primary sound axis is −10 dB or less.

9. The playback device of claim 8, wherein the height of the sidewall defines a convex outer surface.

10. The playback device of claim 9, wherein the convex outer surface has a greatest height at a position offset from the axis in a forward direction.

11. The playback device of claim 8, wherein a height of the sidewall tapers from an apex in a forward direction towards the forward portion and tapers in a rearward direction towards the rear portion, and wherein the forward taper is steeper than the rearward taper.

12. The playback device of claim 8, wherein the radial dimensions at the left and right portions of the sidewall are each greater than the radial dimensions at the rear and forward portions of the sidewall.

13. The playback device of claim 8, wherein the rear portion of the sidewall extends substantially parallel to the axis.

14. The playback device of claim 8, wherein the transducer comprises a diaphragm supported by a suspension, the diaphragm configured to be displaced in a direction substantially aligned with the axis, and wherein a first end of the sidewall is disposed adjacent to the suspension.

15. A playback device comprising:

an elongated body defining an outer perimeter that includes a forward surface and a rear surface;

an audio transducer carried by the body and configured to output sound along a first axis; and a waveguide in fluid communication with the audio transducer, the waveguide comprising:

a sidewall extending circumferentially around the audio transducer, the sidewall having a first end adjacent the audio transducer and a second end adjacent the outer perimeter; and an opening defined by the sidewall, the opening having a larger area at the second end than at the first end;

wherein a rear portion of the sidewall is more steeply angled with respect to the first axis than a forward portion of the sidewall, wherein the audio transducer and the waveguide are configured such that, during playback of audio at 2000 Hz via the audio transducer, acoustic energy along the first axis is greater than acoustic energy along a forward axis by between 10 dB and 50 dB, and wherein the forward axis is horizontally angled with respect to the first axis by between about 60 to 80 degrees.

16. The playback device of claim 15, wherein a left portion of the sidewall and a right portion of the sidewall are each less steeply angled with respect to the first axis than the rear portion of the sidewall.

17. The playback device of claim 15, wherein the second end of the sidewall has a contour substantially corresponding to the outer perimeter.

18. The playback device of claim 15, wherein the sidewall extends around the first axis, and wherein a height of the second end of the sidewall varies with an azimuthal angle about the first axis such that the height at the rear and forward portions of the sidewall is less than the height at left and right portions of the sidewall.

* * * * *